(12) United States Patent
Bendersky et al.

(10) Patent No.: US 10,594,694 B2
(45) Date of Patent: Mar. 17, 2020

(54) SECURE OFFLINE CACHING AND PROVISIONING OF SECRETS

(71) Applicant: CyberArk Software Ltd., Petach-Tikva (IL)

(72) Inventors: Arthur Bendersky, Petach-Tikva (IL); Dima Barboi, Tel Aviv (IL)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 0 days.

(21) Appl. No.: 16/298,149

(22) Filed: Mar. 11, 2019

(65) Prior Publication Data
US 2020/0053079 A1 Feb. 13, 2020

Related U.S. Application Data

(63) Continuation-in-part of application No. 16/266,386, filed on Feb. 4, 2019, which is a continuation-in-part of application No. 16/059,556, filed on Aug. 9, 2018.

(51) Int. Cl.
*H04L 29/06* (2006.01)
*H04L 29/08* (2006.01)
(Continued)

(52) U.S. Cl.
CPC ........ *H04L 63/0876* (2013.01); *H04L 9/0618* (2013.01); *H04L 9/0866* (2013.01); *H04L 63/045* (2013.01); *H04L 67/2842* (2013.01)

(58) Field of Classification Search
CPC ....... H04W 12/04; H04W 12/06; H04W 4/80; H04L 9/0825; H04L 9/30; H04L 63/0428;
(Continued)

(56) References Cited

U.S. PATENT DOCUMENTS 8,116,455 B1 * 2/2012 Sussland ............... G06F 21/575
  380/277
9,491,183 B1  11/2016 Dippenaar
(Continued)

FOREIGN PATENT DOCUMENTS

WO  WO 2008/082337 A1  7/2008
WO  WO2018064765 A1  4/2018

OTHER PUBLICATIONS

Communication and Search Report, issued from the European Patent Office in corresponding Application No. 19166849.0-1218, dated May 24, 2019 (9 pages).

*Primary Examiner* — Brian F Shaw
(74) *Attorney, Agent, or Firm* — Finnegan, Henderson, Farabow, Garrett & Dunner LLP

(57) ABSTRACT

Disclosed embodiments relate to securely caching and provisioning secrets for use in an offline process. Techniques include accessing, at an endpoint computing resource storing a secret, a first cryptographic key; encrypting the secret using the first cryptographic key; receiving, from an auxiliary device, a second cryptographic key; encrypting the encrypted secret with the second cryptographic key to produce an encrypted block; sending, without using a network connection, the encrypted block to the auxiliary device for decryption; receiving, from the auxiliary device and without using a network connection, a decrypted version of the encrypted block; and decrypting the encrypted secret with a cryptographic key corresponding to the first cryptographic key.

20 Claims, 22 Drawing Sheets

(51) Int. Cl.
*H04L 9/08* (2006.01)
*H04L 9/06* (2006.01)

(58) Field of Classification Search
CPC ... H04L 63/0853; H04L 63/10; H04L 63/061; H04L 63/062; B60R 2325/108; B60R 2325/205
See application file for complete search history.

(56) References Cited

U.S. PATENT DOCUMENTS

| | | |
|---|---|---|
| 10,019,591 B1 * | 7/2018 | Beguin ................ H04L 63/08 |
| 2007/0300080 A1 * | 12/2007 | Brown ................ H04L 9/0825 713/193 |
| 2009/0183247 A1 | 7/2009 | Kasper et al. |
| 2014/0157381 A1 | 6/2014 | Disraeli |
| 2014/0282961 A1 | 9/2014 | Dorfman et al. |
| 2015/0089604 A1 | 3/2015 | Matthew |
| 2016/0070898 A1 | 3/2016 | Kwok-Suzuki |
| 2016/0218875 A1 * | 7/2016 | Le Saint ............ H04L 9/0822 |
| 2017/0011220 A1 | 1/2017 | Efremov |
| 2017/0118025 A1 | 4/2017 | Shastri et al. |
| 2017/0134357 A1 | 5/2017 | Ohlsson |
| 2017/0180351 A1 | 6/2017 | Lu et al. |
| 2018/0295190 A1 | 10/2018 | Lu |

\* cited by examiner

SECURE OFFLINE CACHING AND PROVISIONING OF SECRETS

CROSS-REFERENCE TO RELATED APPLICATIONS

This application is a continuation-in-part of, and claims the benefits of priority from, U.S. application Ser. No. 16/266,386, filed on Feb. 4, 2019, which in turn is a continuation-in-part of U.S. application Ser. No. 16/059,556, filed on Aug. 9, 2018, the entirety of each of which is hereby incorporated by reference.

BACKGROUND

Many common security techniques are based on outdated notions of enterprises having well-controlled and clearly defined perimeters. In such environments, firewalls were the primary security tool to protect computing resources within the enterprise. But in modern environments, applications are increasingly being hosted in cloud-based systems, rather than through on-premises infrastructure within an enterprise. Further, many users of computing devices are moving outside the perimeters of enterprises to perform their computing activities. Consequently, many legacy security techniques are not only costly, complex, cumbersome, and ineffective, but they also lead to security vulnerabilities.

Security approaches that rely on all users being within an enterprise perimeter create risks because they allow for unrestricted lateral movement by users within the enterprise. This includes connecting from computer to computer, to applications, and to other resources. Further, such approaches often require a hole in a firewall for outside communications, which is also a risk. Moreover, these approaches limit user freedom, movement, and productivity. They thus result in a poor user experience, require significant IT overhead within the enterprise, and lack visibility into users' actual use of applications.

Other existing security techniques are inadequate in terms of their usability, flexibility, security performance, and speed. For example, some techniques allow users to authenticate themselves through biometrics. Nevertheless, when biometrics alone are used, they are vulnerable in terms of attacks that duplicate biometric information or hashes of such information. Similarly, some techniques rely on the use of passwords. But passwords are also vulnerable to theft or duplication, and further require users to memorize them on a continuous and changing basis. Indeed, passwords are often the weakest link in a security regime. Passwords further require management and IT burdens. Other techniques attempt to authenticate users based on observed environmental factors or calculated risk factors, such as geographic location and user activity. Yet these techniques are prone to false positives and false negatives, and require complex sets of rules to implement. Further, none of these techniques can confirm the current physical proximity between a user, a computing device they are using, and a secured resource they are trying to access. At best, these techniques provide only partial information regarding such a proximity status.

Additional security vulnerabilities and disruptions occur when users needing to securely access devices, applications, files, data, or other resources have no network connection (e.g., because of air travel, lack of network coverage, network downtime, network failures, etc.) or a poor quality connection. When users anticipate a lack of a reliable network connection, they sometimes implement workarounds (e.g., storing sensitive documents or data locally, storing such materials on removable storage like USB drives, bypassing security requirements, etc.). This creates significant security gaps and vulnerabilities. On the other hand, when users wait until they have a reliable connection to access secure resources, this results in a loss of productivity, inefficiencies, and missed opportunities.

There are thus technological needs for systems and methods that more securely, flexibly, and quickly authenticate users seeking access to network-restricted resources. It would be advantageous for solutions to not rely on the presence of an agent running on an endpoint device in all situations. Further, it would be advantageous for such solutions to not require passwords or other authentication credentials that users must memorize or supply. It would also be advantageous to allow client devices to access controlled target network resources, following passwordless authentication, without directly connecting the client device to the target resources. In addition, it would be advantageous for such solutions to operate with various different types of identification and verification technologies and protocols. Such solutions may also advantageously utilize authentication techniques such as biometric recognition, voice recognition, body or movement sensing, and artificial intelligence techniques. It may also be advantageous for such solutions to be transparent to users of client devices, to the client devices they are using, or to target network resources they are accessing. Further, in situations where such solutions are implemented using an application (e.g., a mobile app), it may be advantageous to separate any confidential or biometric information about the user from the application itself, and instead store only public or non-sensitive user information in the app (e.g., name, title, contact information, etc.).

In addition, it would be advantageous for solutions to confirm the proximity between a user, their computing device, and a secured resource they are trying to access. By confirming the proximity between these entities, systems may more reliably determine that a user is who they purport to be. Further, it would be advantageous for such techniques to involve secret splitting, so that at least a portion of a secret needed for access control is provided to a computing device controlling access and another portion is provided to the user's personal computing device, such that a combination of the secret portions may enable access. In this manner, even if a malicious actor obtained one of the secret portions, they would not be able to access the secured resource because they would be lacking the other portion(s). According to such techniques, when implemented by a security service provider operating between the user and the secured resource, access control may also be guaranteed to run through the security service provider by requiring its intermediation, thus providing stronger levels of security.

In other embodiments, it would be advantageous to provide users access to secrets or access-protected resources (e.g., logging in to an operating system, running an application, accessing protected data, etc.) even when they have no network connection (or a weak connection). According to embodiments described herein, secrets (e.g., passwords, keys, tokens, certificates, hashes, etc.) may be stored securely on an endpoint device such that the secrets are inaccessible to a user without the user interacting with a separate auxiliary device to decrypt the secret. Through such techniques, even if an endpoint device (e.g., laptop, personal computer, tablet, etc.) is stolen, access to protected secrets on the device may be protected against theft or misuse.

SUMMARY

The disclosed embodiments describe non-transitory computer readable media and methods for securely caching and provisioning secrets for use in an offline process. For example, in an exemplary embodiment, there may be a non-transitory computer readable medium including instructions that, when executed by at least one processor, cause the at least one processor to perform operations for securely caching and provisioning secrets for use in an offline process. The operations may comprise accessing, at an endpoint computing resource storing a secret, a first cryptographic key; encrypting the secret using the first cryptographic key to produce an encrypted secret; receiving, from at least one auxiliary device configured for local and non-network based communications with the endpoint computing resource, a second cryptographic key; encrypting the encrypted secret with the second cryptographic key to produce an encrypted block; storing the encrypted block; sending, without using a network connection, the encrypted block to the at least one auxiliary device for decryption; receiving, from the at least one auxiliary device and without using a network connection, a decrypted version of the encrypted block, the decrypted version including the encrypted secret; and decrypting the encrypted secret with a cryptographic key corresponding to the first cryptographic key.

According to a disclosed embodiment, the secret is configured to provide secure and access-restricted access to an application, operating system, file, or service provided by the endpoint computing device.

According to a disclosed embodiment, the first cryptographic key is a symmetric key.

According to a disclosed embodiment, the first cryptographic key is an asymmetric key from a private-public key pair, and wherein encrypting the secret includes encrypting the secret using a public key from the private-public key pair.

According to a disclosed embodiment, the cryptographic key corresponding to the first cryptographic key is a private key from the private-public key pair.

According to a disclosed embodiment, accessing the first cryptographic key includes generating the first cryptographic key.

According to a disclosed embodiment, the second cryptographic key is a symmetric key.

According to a disclosed embodiment, the second cryptographic key is an asymmetric key from a private-public key pair.

According to a disclosed embodiment, the encrypted block is stored on the endpoint computing resource.

According to a disclosed embodiment, the encrypted block is stored on a device physically separate from the endpoint computing resource, which is configured for local and non-network based communications with the at least one auxiliary device.

According to another disclosed embodiment, a method may be implemented for securely caching and provisioning secrets for use in an offline process. The method may comprise accessing, at an endpoint computing resource storing a secret, a first cryptographic key; encrypting the secret using the first cryptographic key to produce an encrypted secret; receiving, from at least one auxiliary device configured for local and non-network based communications with the endpoint computing resource, a second cryptographic key; encrypting the encrypted secret with the second cryptographic key to produce an encrypted block; storing the encrypted block; sending, without using a network connection, the encrypted block to the at least one auxiliary device for decryption; receiving, from the at least one auxiliary device and without using a network connection, a decrypted version of the encrypted block, the decrypted version including the encrypted secret; and decrypting the encrypted secret with a cryptographic key corresponding to the first cryptographic key.

According to another disclosed embodiment, the second cryptographic key is received from the at least one auxiliary device via at least one of: RFID, Bluetooth, an image or textual code, or an auditory signal.

According to another disclosed embodiment, the encrypted block is sent to the at least one auxiliary device via at least one of: RFID, Bluetooth, an image or textual code, or an auditory signal.

According to another disclosed embodiment, the at least one auxiliary device is at least one of: a mobile telephonic device, a mobile tablet device, an element of computer-enabled clothing, or an element of computer-enabled jewelry.

According to another disclosed embodiment, the first cryptographic key is a one-time-use key.

According to another disclosed embodiment, the first cryptographic key becomes invalid after decrypting the encrypted secret with the cryptographic key corresponding to the first cryptographic key.

According to another disclosed embodiment, the first cryptographic key becomes invalid after a session between the at least one auxiliary device and the endpoint computing resource.

According to another disclosed embodiment, the first cryptographic key expires after a determined duration.

According to another disclosed embodiment, the method further comprises receiving, from a second auxiliary device configured for local and non-network based communications with the endpoint computing resource, a third cryptographic key; and encrypting the encrypted block with the third cryptographic key to produce a doubly encrypted block.

According to another disclosed embodiment, the method further comprises receiving, from the second auxiliary device and without using a network connection, a decrypted version of the doubly encrypted block, the decrypted version including the encrypted block.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The various implementations described herein overcome the deficiencies in usability, security performance, and speed associated with prior security techniques. In particular, as discussed below, disclosed techniques allow for users of client computing devices to authenticate themselves in a seamless, passwordless manner, and without compromising security or the user experience. Further, techniques allow for a security service to confirm the current proximity of a user to their personal computing device and a system to which they are seeking access. Disclosed techniques also permit a security service to require its own intermediation in order for a user to obtain access to a secure resource. The security service may accomplish this as part of techniques for secret splitting and encryption, as discussed below. Additional implementations described below allow for secure provisioning and access to secrets in an offline mode. Through such techniques, even when an endpoint resource lacks a network connection, a secret stored on the endpoint may securely be accessed through the use of a participating auxiliary device. Accordingly, legitimate access to a secret is conditioned on the user being in close proximity to the endpoint and the auxiliary device, and at the same time theft of the secret is thwarted.

Reference will now be made in detail to the disclosed embodiments, examples of which are illustrated in the accompanying drawings.

Figure 1:
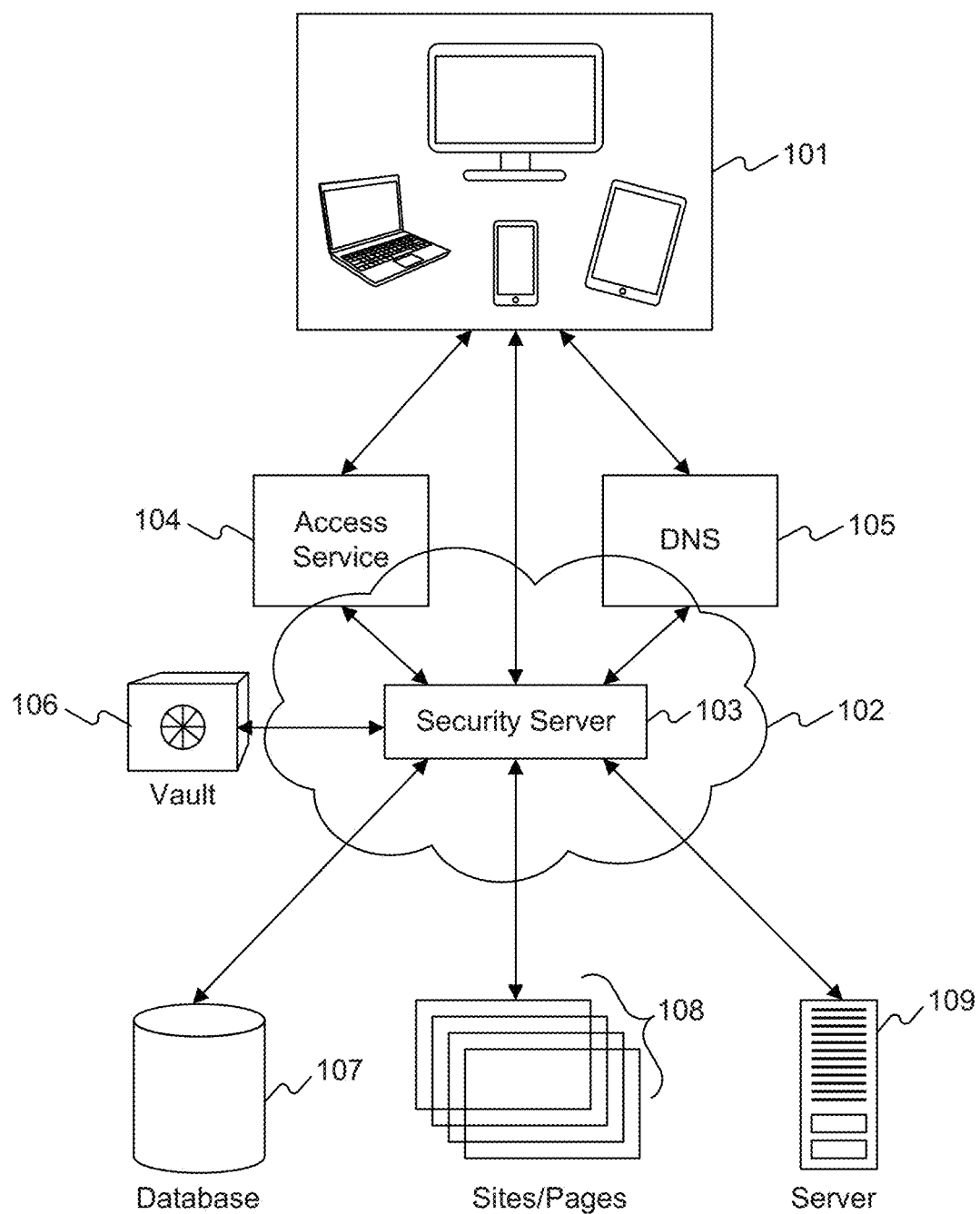
FIG. 1 is a block diagram of an example system, in accordance with disclosed embodiments.

FIG. 1 is a block diagram of an example system 100 for passwordless authentication of users consistent with disclosed embodiments. As shown, system 100 includes a plurality of client computing devices 101 that may communicate through a network 102 with one or more access-restricted target resources 107-109, such as a secure database 107, websites or pages enabling users to interact with remotely hosted secure applications 108, and secure servers 109. Access to access-restricted target resources 107-109 may be controlled, at least in part, by security server 103. As discussed further below, in some embodiments security server 103 may also communicate with an access service 104, DNS server 105, and secure credential vault 106.

Client computing devices 101, also referred to herein as auxiliary devices of a user, may be a variety of different types of computing devices with network communications capabilities. Examples include personal computers, laptops, mobile computing devices (e.g., smartphones), tablets, IoT devices, wearable computer devices (e.g., smart clothing, smart watches, smart jewelry, etc.), automotive computer devices, smart home appliances, etc. As discussed further below, such client computing devices 101 may include hardware processors and memories for storing data and/or software instructions, as well as communications interfaces for exchanging data with remote servers (e.g., security server 103 and target resources 107-109). As discussed further below, client computing devices 101 may also have software and hardware (e.g., cameras, fingerprint sensors, heartrate monitors, accelerometers, etc.) configured to perform physical authentication of a user of a client computing device 101, audio recording and playback capabilities, and graphics capabilities for rendering visual content on a display screen.

Network 102 may be based on any type of computer networking arrangement used to exchange data, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile network, a private data network, a virtual private network using a public network, a nearfield communications technique (e.g., Bluetooth, infrared, etc.) that enables the system 100 to send and receive information between the components in the system 100. In some embodiments, network 102 may include two or more of these forms of communications. As an example, client computing devices 101 may communicate with security server 103 via Bluetooth or RFID, while security server 103 communicates with access service 104, DNS server 105, or vault 106 via WiFi or the Internet. Of course, different combinations are possible as well.

Target network resources 107-109 may include one or more access-restricted resources, such as secure database 107, sites or pages 108 that allow a user to interact with a remote application, or a secure server 109. An access-restricted target resource 107-109 may be any secure device, application, database, server, and/or network that requires a user (e.g., user of client computing device 101) to be authenticated before accessing the resource. Further, in some embodiments as discussed below, access-restricted target resources may include physical spaces, enclosures, or devices to which access is limited, such as vehicles, rooms, buildings, elevators, equipment, appliances, lighting, home automation devices, etc.

As examples of access-restricted target resources 107-109, secure database 107 may hold confidential corporate data, such as financial or technical information. Sites and pages 108 may be, for example, virtualized instances of applications running in a cloud-computing environment, such as a cloud platform based on MICROSOFT AZURE, AMAZON WEB SERVICES (AWS), GOOGLE CLOUD PLATFORM, IBM CLOUD, or similar systems. Such applications may thus be accessed on-demand by users through the techniques discussed below. Secure server 109 may be a secure web hosting server, web development server, cybersecurity server, human resources server, competitive intelligence server, or various other types of secure servers capable of communicating with client computing devices 101.

Access service 104 may be a portal or proxy server configured to provide access to access-restricted target resources 107-109. For example, access service 104 may be a web-based portal, an intranet portal, or another type of access point that client computing devices 101 may connect to before being able to access access-restricted target resources 107-109. Similarly, access service 104 may be a proxy server to which client computing devices 107-109 send some or all of their outgoing communications. As discussed further below, access service 104 may be configured to analyze outgoing communications from client computing devices 101 and determine whether they should be intercepted and processed by security server 103. In addition, DNS server 105 may be used to intercept and reroute communications (e.g., by IP address resolution) from client computing devices 101. Various different forms of such interception and rerouting are possible, as discussed further below.

In some embodiments, access service 104 functions to discover identities (e.g., machines, applications, virtualized application instances, and other resources) associated with access-restricted target resources 107-109 or the broader network in which they operate. In many instances, access-restricted target resources 107-109 may be invisible to the public internet, since they are access-protected and secured. Thus, in order for security server 103 to facilitate access between client computing devices 101 and access-restricted target resources 107-109, access service 104 may develop a list or mapping of access-restricted target resources 107-109 (e.g., in terms of their IP address, MAC address, unique resource name, virtual machine identifier, cloud container identifier, serverless code identifier, etc.). In some embodiments, access service 104 may perform this investigation through a directory service (e.g., MICROSOFT ACTIVE DIRECTORY), through a discovery tool (e.g., CYBERARK DNA), through a cloud orchestration application (e.g., AWS CONSOLE, AZURE PORTAL, etc.), or through other techniques.

In some embodiments, a vault 106 may be accessed by security server 103 in establishing secure connections between client computing devices 101 and access-restricted target resources 107-109. For example, as discussed further below, in situations where a user of a client computing device 101 has been successfully authenticated, security server 103 may fetch a secret (e.g., authentication key, credential, token, password, etc.) from vault 106 for authentication of the user (or a corresponding identity or account) to the appropriate access-restricted target resource 107-109. Further, in some embodiments, security server 103 also logs the user or identity into a session at the appropriate access-restricted target resource 107-109, and such a log-in process may involve a secret obtained from vault 106. In other embodiments, vault 106 is not used or communicated with by security server 103. Further, where vault 106 is utilized by security server 103, the secrets stored within vault 106 may not be provided to the user or their client computing device 101. Accordingly, the user of a client computing device 101 may still be able to be authenticated in a passwordless manner to access access-restricted target resources 107-109.

Figure 2:
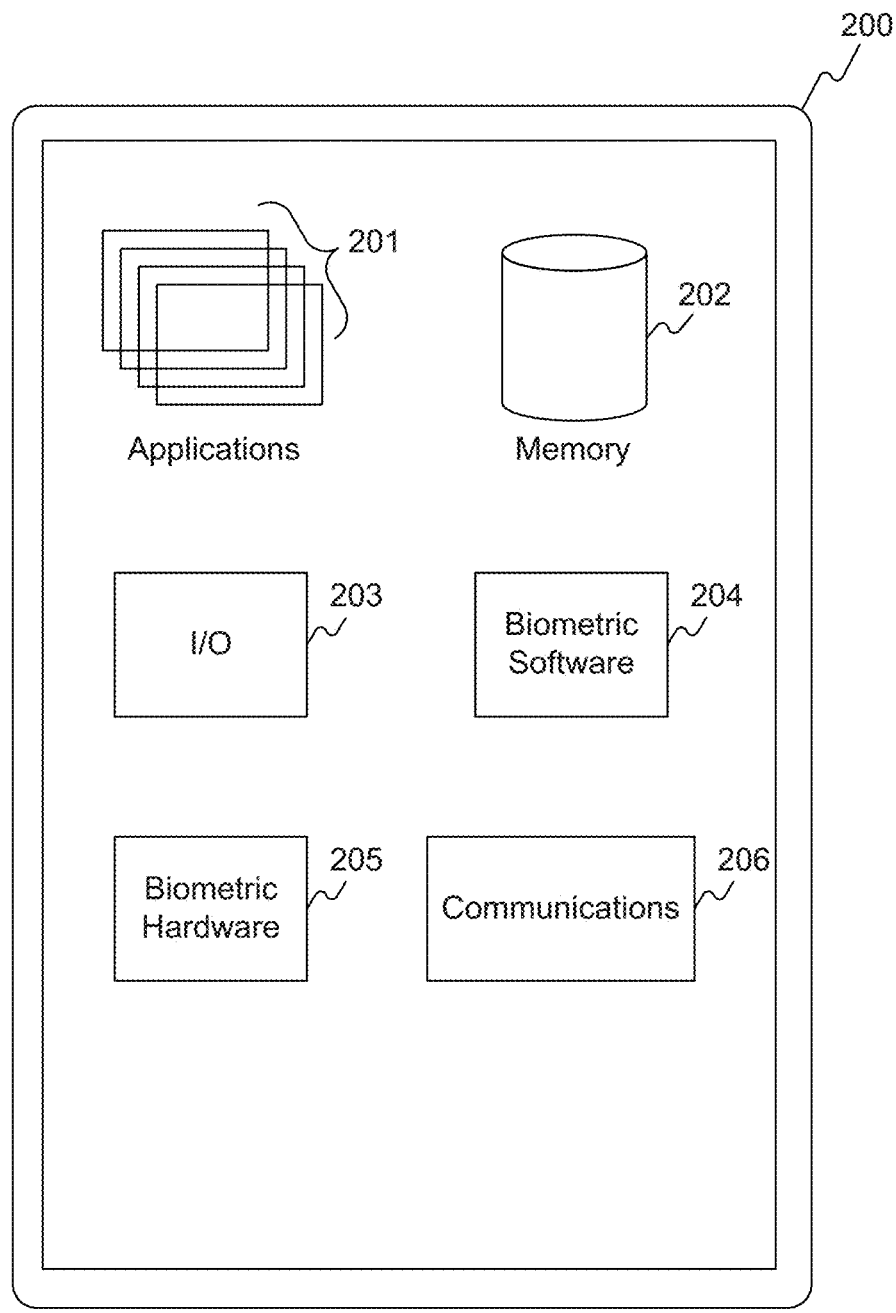
FIG. 2 is a block diagram of an example client computing device, in accordance with disclosed embodiments.

FIG. 2 is a block diagram of an example client computing device 200, or auxiliary device, consistent with disclosed embodiments. As discussed above, client computing device 200 may be various different types of network-enabled devices, such as the various client computing devices 101 described in connection with FIG. 1.

Client computing device 200 may include one or more applications 201. Examples of applications include business applications (e.g., an ORACLE database application, AMAZON AWS cloud management application, VMWARE virtual machine application, CISCO remote access application, MICROSOFT OUTLOOK email application, proprietary business applications, etc.) and personal applications (e.g., GOOGLE GMAIL, FACEBOOK, TWITTER, LINKEDIN, etc.). Some such applications may have a dual business-personal purpose. In some embodiments, the actual application software resides on the client computing device 200 itself. In other embodiments, the actual applications reside on a remote server (e.g., access-restricted target resources 107-109). In such situations, the application may execute remotely from the client computing device 200, and the application may be selectable by the user via a graphical icon or other representation on the client computing device. Selecting the icon or other representation may instruct client computing device 200 to send a request to access the selected application (e.g., from access-restricted target resources 107-109). As discussed further below, such requests may be intercepted through various techniques before they directly reach access-restricted target resources 107-109.

In some embodiments, applications 201 also include a security application configured to communicate with security server 103 or access service 104. This security application may act as a proxy agent, monitoring outgoing communications from client computing device 200 and determining when a communication is seeking access to access-restricted target resources 107-109. Further, the security application may be configured to route all outgoing communications from client computing device 200 to security server 103 or access service 104. In embodiments where applications 201 include a security application, the security application may also be configured to store a user profile or account associated with one or more users of the client computing device. This profile or account may contain non-confidential information, such as the user's name, title, email address, or other contact information. In some embodiments, the user of the security application is required to authenticate themselves in order to access the application (e.g., using a corporate username and ID, biometrics, security question prompts, etc.). Nevertheless, other embodiments permit the user to access the security application and build their profile or account without authentication.

The security application running on client computing device 200 may further be configured to participate in or facilitate a process of dual-mode, passwordless authentication of the user, as discussed further below in connection with FIGS. 3-10. For example, as discussed below, the security application may provide instructions to the client computing device 200 to perform a physical (e.g., biometric, biological, movement-based, etc.) authentication of the user. Further, the security application may be configured to instruct the client computing device 200 to return to security server 103 or access service 104 a unique session identifier that has been received by the client computing device 200. In the process of facilitating the dual-mode, passwordless authentication of the user, the security application may also instruct the client computing device 200 to use other hardware or software residing on the client computing device 200, such as a camera, fingerprint sensor, accelerometer, gyroscope, etc., as discussed further below.

As shown in FIG. 2, client computing device 200 may also include a memory 202, which may be one or more discrete memory hardware devices. Memory 202 may include one or more hard disk, random access memory (RAM), read-only memory (ROM), erasable programmable read-only memory (EPROM or Flash memory), static random access memory (SRAM), or other forms of memory. Memory 202 may store the applications 201 (or icons thereof) residing on the client computing device 200, an operating system of the client computing device 200 (e.g., ANDROID OS, SAMSUNG BADA, MICROSOFT WINDOWS, APPLE OS, IPHONE OS, LINUX/UNIX, BLACKBERRY OS, etc.), the user profile or account information discussed above, and various types of biometric software 204.

Biometric software 204 may be one or more applications for authenticating a user in terms of physical traits or characteristics. For example, biometric software 204 may be configured to authenticate a user's face, eye retina, voice, saliva, blood, hair, or fingerprint, among other physical features. Further, biometric software 204 may be configured to authenticate a user in terms of patterns or averages of other physical attributes, such as the user's heartrate, walking cadence or speed, typing or clicking activity, cursor movement, gaze detection or eyeball monitoring, chemical (e.g., pheromone) production, application usage frequency or timing, or environmental characteristics, among other factors. In some embodiments, artificial intelligence or machine learning may be used to determine reliable and distinctive physical attributes of a user that may be observed, analyzed, and used for authentication of the user.

Client computing device 200 may further include input/output device 203, which may include one or more interfaces for physical connections to external devices, sensors, visual rendering devices, or auditory rendering devices. Examples of input/output device 203 include a USB connection (e.g., Type A, Type B, Type C, etc.), Ethernet (e.g., CAT-5) connection, VGA connection, HDMI connection, display screen, touchscreen display, loudspeaker, microphone, camera, gyroscope, accelerometer, GPS, proximity sensor, magnetometer, luxmeter, etc. In some embodiments, some of these forms of input/output devices 203 may also function as biometric hardware 205. For example, a microphone, camera, gyroscope, accelerometer, etc., may be used in the types of physical authentication of a user discussed above.

Communications interface 206 may enable the client computing device 200 to communicate wirelessly with one or more external devices, such as security server 103, access service 104, access-restricted target resources 107-109, and other network resources. Examples of communications interface 206 may include a WiFi transceiver, Bluetooth transceiver, RFID transceiver, infrared transceiver, cellular transceiver, mesh network transceiver, etc. In some embodiments, one or more applications 201 (e.g., a security application, as discussed above) may instruct communications interface 206 to communicate with an external resource (e.g., security server 103, etc.).

Figure 3:
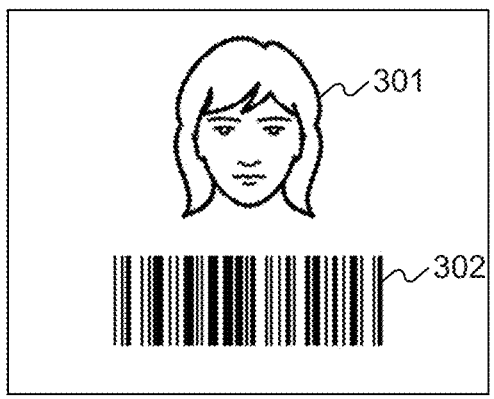
FIG. 3 is an illustration of exemplary forms of information that may be used in dual-mode, passwordless authentication, in accordance with disclosed embodiments.
Figure 3:
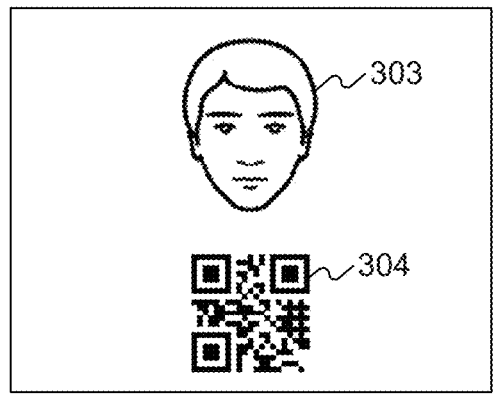
Figure 3:
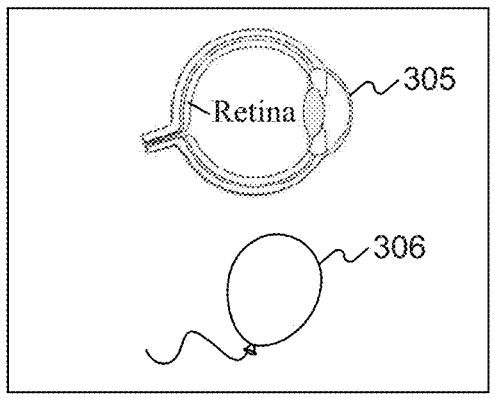
Figure 3:
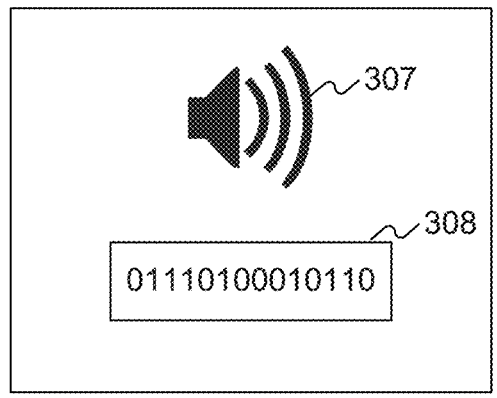
Figure 3:
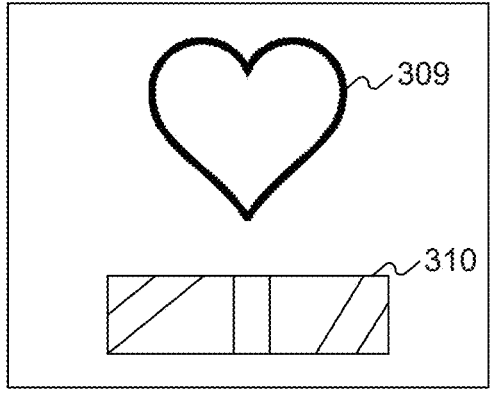
Figure 3:
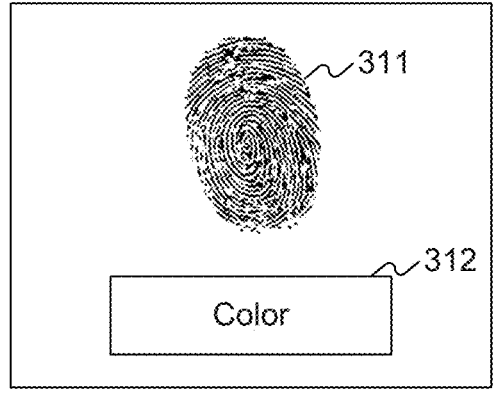

FIG. 3 is an illustration of exemplary forms of information 300 that may be used in dual-mode, passwordless authentication consistent with disclosed embodiments. In particular, as discussed below in connection with processes 400, 500, and 600 of FIGS. 4-6, dual-mode, passwordless authentication of a user may involve a physical authentication process and a return of a unique session identifier that was provided to a client computing device. The same types of information 300, or portions thereof, may also be used in connection with processes 1300 and 1400, as discussed below in connection with FIGS. 13-14.

As described above, various forms of physical authentication of a user are possible. Utilizing biometric software 204 and hardware 205 of client computing device 200, for example, a user may be authenticated in terms of various physical traits (e.g., biometrics, biological traits, etc.) or characteristics that are observed and analyzed. Further, as discussed below in greater detail, when a client computing device receives a unique session identifier (e.g., from security server 103), the user may operate the client computing device to return the unique session identifier back to the security server 103. In this way, two different forms of authentication of the user may be performed. The physical authentication may validate the presence of the user at the client computing device, and the return of the unique session identifier may validate the particular client computing device that they are currently using. Notably, users may authenticate themselves in this manner without having to supply a password or other secret to security server 103.

As illustrated in FIG. 3, the dual-mode, passwordless authentication may involve a physical identification based on facial recognition 301 and a unique session identifier in the form of a barcode 302. As an alternative, the dual-mode, passwordless authentication may involve a physical identification based on facial recognition 303 and a unique session identifier in the form of a QR code 304. Further, the dual-mode, passwordless authentication may involve a physical identification based on a retinal scan 305 of the user and a unique session identifier in the form of a graphical image or icon 306 (depicted as a balloon). In other embodiments, the dual-mode, passwordless authentication may involve a physical identification based on voice recognition 307 and a unique session identifier in the form of a unique string of characters 308 (e.g., numerical, alphabetical, or alphanumeric). Still further, the dual-mode, passwordless authentication may involve a physical identification based on heart rate analysis 309 (e.g., through pattern detection, AI, machine learning, etc.) and a unique session identifier in the form of a unique graphical pattern 310. As another option, the dual-mode, passwordless authentication may involve a physical identification based on fingerprint recognition 311 and a unique session identifier in the form of a particular color 312 (e.g., red, blue, purple, etc.).

Consistent with the above description of the software and hardware capabilities of a client computing device, other forms of physical authentication of a user may be used in addition or as alternatives to the examples shown in FIG. 3. Similarly, the unique session identifier may be various different types of symbols, graphics, or text that can be returned by a user to security server 103, either with or without decoding by the client computing device. In some embodiments, the user of a client computing device uses a component of the client computing device (e.g., the camera) to scan the unique session identifier and return it to security server 103. Alternatively, the user may read the unique session identifier as displayed on the client computing device and enter it via the client computing device to be returned to the security server 103.

Figure 4:
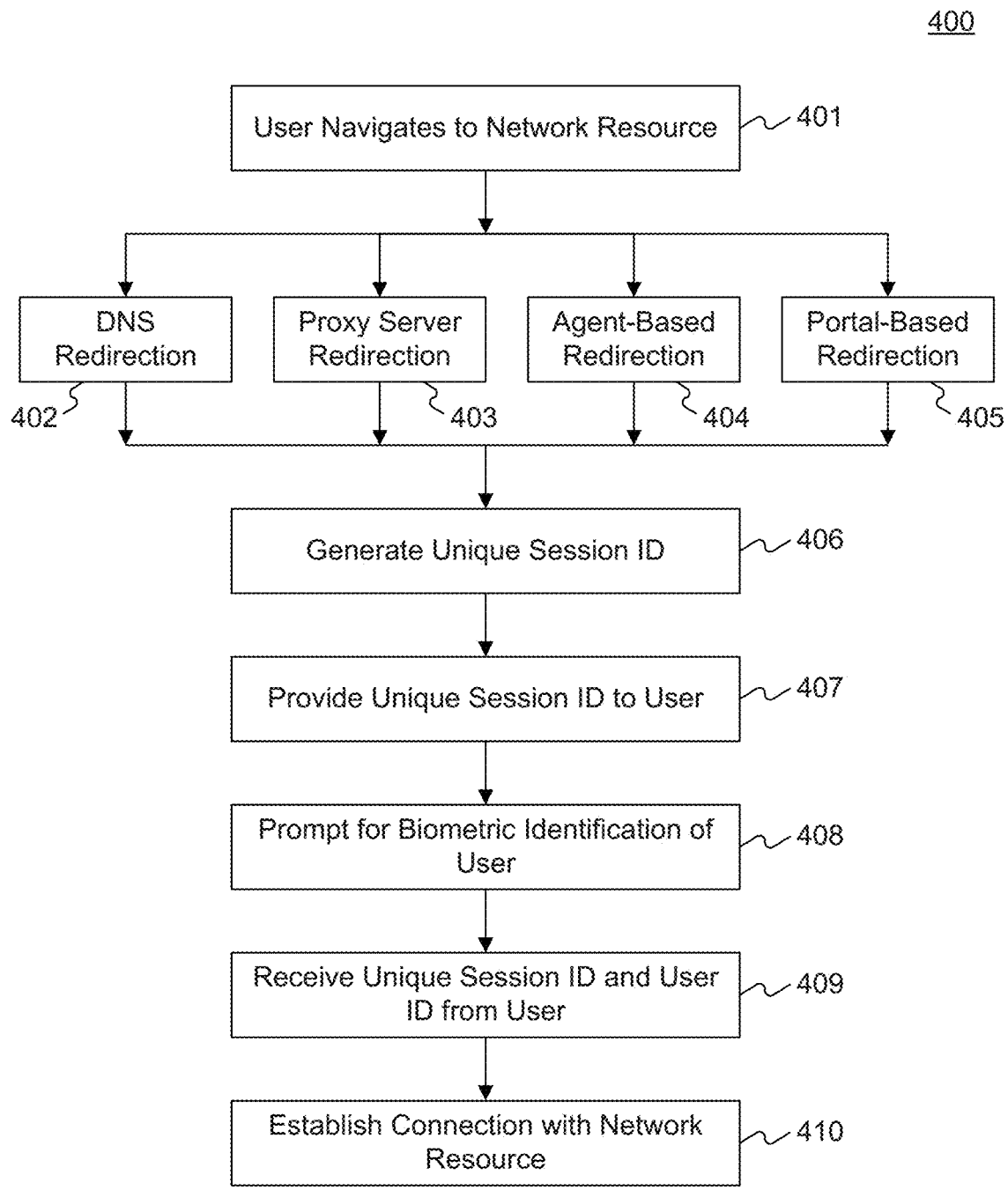
FIG. 4 is a flowchart of passwordless authentication of a user, in accordance with disclosed embodiments.

FIG. 4 is a flowchart of a process 400 for passwordless authentication of a user consistent with disclosed embodiments. Process 400 may be performed in the system environments described herein (e.g., system 100 of FIG. 1, system 700 of FIG. 7, system 800 of FIG. 8, system 900 of FIG. 9, or system 1000 of FIG. 10). In some embodiments, process 400, or individual steps from process 400, may be performed in combination with processes 1300 and 1400, as described further below. For example, a user may be at least initially authenticated based on process 400 before proceeding to processes 1300 and 1400. Alternatively, processes 400 and 1300/1400 may be separate and independent.

Process 400 may include an operation 401 of determining that a user of a client computing device, also referred as the auxiliary device of the user, is attempting to navigate to an access-protected target resource. For example, a security application running on the client computing device may monitor outgoing communications from the client computing device, and detect when the address of such a communication (e.g., based on a domain name, IP address, MAC address, resource name, etc.) matches a list or mapping of access-protected target resources. Additional techniques of identifying that a user of a client computing device is attempting to navigate to an access-protected target resource are described below in connection with operations 402-405. Any of these techniques, or others, may be used to intercept and reroute requests from client computing devices.

In an operation 402, the user's request to navigate to an access-protected target resource may be received and redirected through DNS resolution. For example, in system 100, outgoing requests from a client computing device 101 may be received at a DNS server 105. The DNS server may maintain a listing of addresses (e.g., based on domain name, IP address, MAC address, resource name, etc.) associated with access-protected target resources 107-109. When a request from a client computing device 101 matches such an address, the DNS server 105 may reroute the request to an address associated with security server 103 to perform authentication of the user, as discussed further below. For other requests that are not addressed to access-protected target resources, DNS server 105 may resolve the corresponding network address in the regular manner and permit the client computing device 101 to access them. In this manner, DNS server 105 may perform address resolution and rerouting functions in a manner transparent to the user and to their client computing device 101.

Operation 403 may involve redirecting requests from a client computing device through a proxy server. For example, in system 100, when a user of a client computing device 101 requests access to an access-protected target resource 107-109, access service 104 may be configured as a proxy server that receives such requests, determines whether they match a list or mapping of access-protected target resources 107-109, and if they do match, reroutes them to security server 103. For requests not addressed to access-protected target resources 107-109, the proxy server may pass the communications through to their intended network address without redirection. This technique thus may also provide a transparent rerouting solution from the standpoint of users and their client computing devices.

Operation 404 may involve redirecting requests from a client computing device using a software agent integrated onto the client computing device itself (e.g., as part of a security application) or onto a particular access-protected target resource. In either type of configuration, the software agent may operate in a manner similar to the proxy server discussed above. For example, the agent may monitor outgoing communications from the client computing device or communications received at the target resource, determine whether the communications are addressed to an access-protected target resource, and if a communication is so addressed, the agent may reroute the communication (e.g., through address modification or other forms of packet modification) to the security server 103. In some embodiments, the agent may use a filtering or intercepting technique such as WINDOWS FILTERING PLATFORM, or similar application programming interface techniques adapted for other operating systems.

Operation 405 involves receiving requests from client computing devices at a portal, and determining at the portal whether they should be directed, or redirected, to security server 103 or passed through to their specified address. For example, in some embodiments, an enterprise seeking to implement disclosed techniques of dual-mode, passwordless authentication may deploy a web-based portal that provides links to various different applications. Some or all of the applications may be access-protected target resources that require authentication before a user can access them. Users may click on links corresponding to the target resources they wish to access. The portal may manage the links using Lightweight Directory Access Protocol (LDAP), may provide hyperlinks (e.g., HTTP links), or use other techniques. In some embodiments, the portal may execute through a server remote to the client computing device, while in other embodiments the portal may be an application running on the client computing device (e.g., a security application, as discussed above).

In operation 406, process 400 may further generate a unique session identifier for the user. As discussed above in connection with FIG. 3, the unique session identifier may be a variety of different types of identifiers that the client computing device can receive and relay back to the security server 103. Examples include barcodes 302, QR codes 304, images or icons 306, text strings 308, graphical patterns 310, colors 312, and more.

In some embodiments, the generated unique session identifier is selected from a database of already-created unique session identifiers. In other embodiments, the unique session identifier is created on-the-fly, in response to the request from the client computing device. For example, the entire unique session identifier may be newly created, or a portion of it (e.g., beginning characters, ending characters, etc.) may be uniquely modified on-the-fly. In some embodiments, the unique session identifier is unique to the user, unique to the request from the client computing device, or unique to both. For example, the unique session identifier may be a one-time use identifier that expires and is not reused.

In operation 407, the unique session identifier may be provided to the user. For example, the unique session identifier may be sent from the security server 103 to the client computing device 101 that transmitted the request identified in operation 401. Once the unique session identifier is received by the client computing device 101, it may be reproduced to the user through hardware and software components of the client computing device 101. For example, the unique session identifier may be displayed on a display screen (e.g., as part of a JavaScript file, HTML page, as part of the security application, etc.), rendered via a loudspeaker, or otherwise presented to the user.

In operation 408, a prompt may be issued for a physical (e.g., biometric, biological, etc.) identification of the user. As discussed above, the physical authentication of the user may be performed using software and hardware components of the client computing device. Examples discussed above in connection with FIG. 3 include facial recognition 301/303, retinal scan recognition 305, voice recognition 307, heart rate recognition 309, fingerprint identification 311, or other similar physical authentication techniques. In some embodiments, the physical authentication is performed entirely on the client computing device. For example, the client computing device may store a reference copy (or hash) of physical identification data associated with the user, and once the user attempts to physically authenticate themselves, the attempt may be compared with the reference data. For example, a stored representation of the user's face may be used as a reference, and a newly captured image of the user's face (e.g., captured via a camera) may be compared to it for authentication. A result of the physical authentication on the client computing device (e.g., expressed as "yes," "no," or a probability of authentication) may be transmitted to the security server 103, as discussed below. In embodiments where reference physical information of the user is stored on the client computing device, it may be stored in a secure memory (e.g., APPLE SECURE ENCLAVE, ANDROID SECURE ELEMENT, etc.). In other embodiments, part of the physical authentication may be performed remotely (e.g., at security server 103). For example, security server 103 may store the reference physical information, and the client computing device may send it captured physical data for comparison purposes.

In operation 409, the user may return the unique session identifier that they received to the security server 103. For example, if the unique session identifier is a QR code, the user may optically scan the received QR code (e.g., using a camera), and send back to the security server a copy of the QR code, a decoded version of its contents, or an encrypted version of its contents. In some embodiments, operations 408 and 409 occur close in time (e.g., simultaneously, nearly simultaneously, within a timed period subject to a timeout, within a time-limited session connection, etc.). That is, the user of the client computing device may be required to perform the physical authentication of themselves substantially at the same time that they receive the unique session identifier from the security server 103 or are prompted to return the unique session identifier back to the security server 103.

In some embodiments, as part of operation 409 the user may also transmit to the security server 103 a user identifier or user identification information. For example, in situations where the user creates a profile or account with personal information on the client computing device (e.g., in the security application), some or all of that identifying information may also be transmitted to the security server 103 to facilitate the authentication of the user. In such situations, the authentication of the user may be based on the physical authentication, the returned unique session identifier, and the transmitted identifying information about the user. These three forms of authentication information may be transmitted individually in separate communications or collectively in a single communication to security server 103.

Further, in some embodiments, the client computing device also transmits to the security server 103 a network address (e.g., domain name, IP address, MAC address, resource name, etc.) that the user was requesting access to. For example, the address may be associated with the access-restricted target resources 107-109 to which the user is seeking secure access. As discussed below, this address information may then be used to facilitate a secure connection between the client computing device 101 and the requested access-restricted target resource 107-109.

In operation 410, if the dual-mode, passwordless authentication of the user is successful, security server 103 may further facilitate or establish a secure connection between the client computing device 101 and the requested access-restricted target resource 107-109. In some embodiments, a security policy at the security server 103 may determine what operations to perform based on the successful authentication. For example, based on the successful authentication, the policy may decide to establish a secure tunnel (e.g., based on Secure Shell, IPSec, SSTP, etc.) between the client computing device 101 and the requested access-restricted target resource 107-109. The requested access-restricted target resource 107-109 may be running or instantiated on demand in a virtualized environment, as described above, such as through a virtual machine, container instance, or serverless code instance. In some embodiments, the client computing device 101 may thus obtain a direct connection to the requested access-restricted target resource 107-109 without having to connect to the network hosting the requested access-restricted target resource 107-109. Of course, the client computing device 101 may be connected to the requested access-restricted target resource 107-109 through techniques other than tunnels as well. In further embodiments, the security policy considers other factors (e.g., the user's geographical location) to determine whether the user is permitted to access the access-restricted target resource 107-109.

In some embodiments, the security server 103 both performs the passwordless authentication of the user and also logs the user in to the requested access-restricted target resource 107-109. Thus, for example, if the requested access-restricted target resource 107-109 is an ORACLE database server or a FACEBOOK account, the user may be logged in to the account automatically and transparently by the security server 103. If such techniques involve obtaining a secret for the log-in process, the security server 103 may obtain the required secret on the user's behalf (e.g., from vault 106). The log-in process on behalf of the user may be performed, for example, through a Security Assertion Markup Language (SAML) authentication process.

Figure 5:
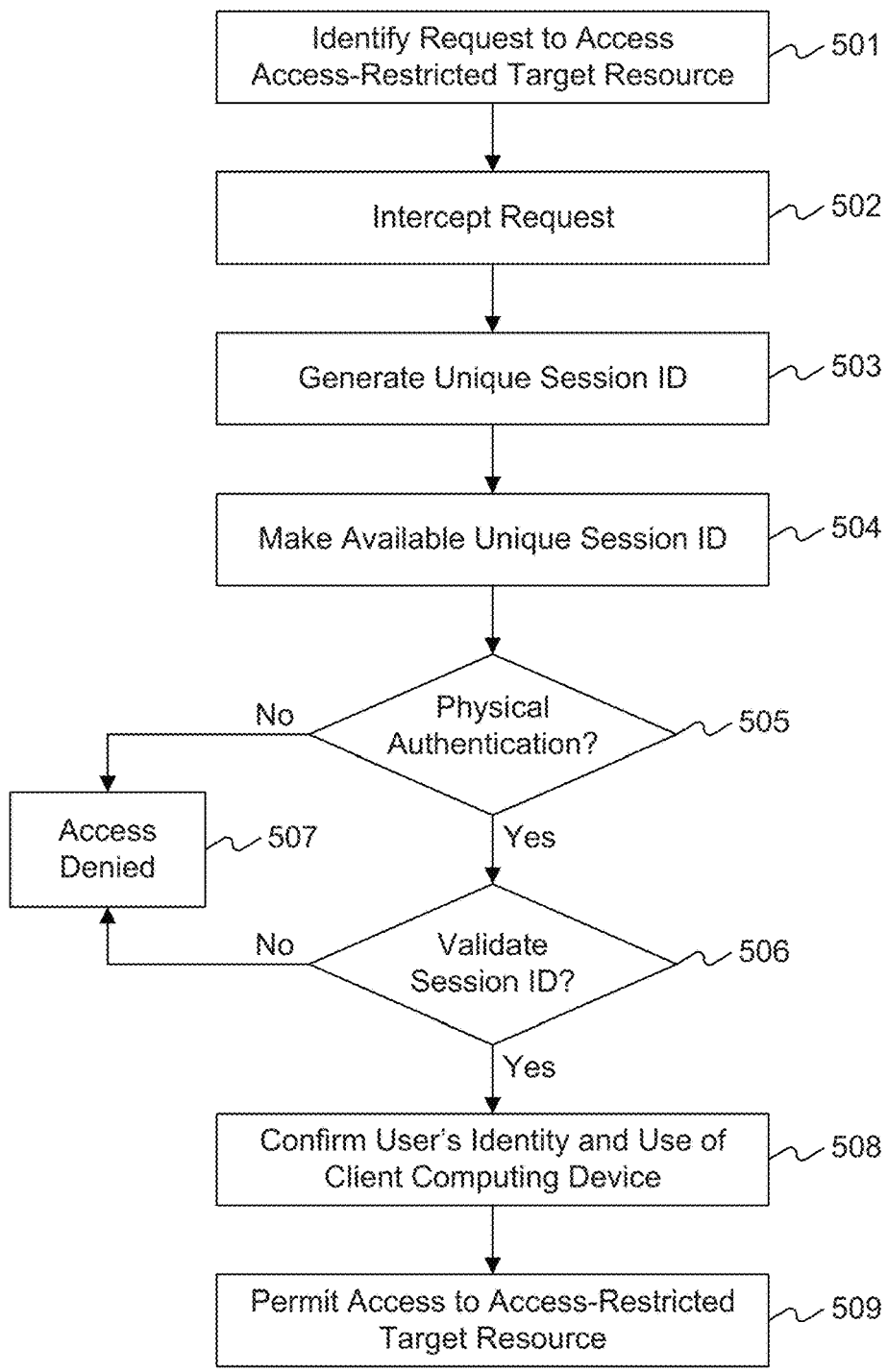
FIG. 5 is another flowchart of passwordless authentication of a user, in accordance with disclosed embodiments.

FIG. 5 is another flowchart of a process 500 for passwordless authentication of a user consistent with disclosed embodiments. Similar to process 400, process 500 may be implemented in accordance with the systems of FIGS. 1 or 7-10. Consistent with embodiments described below, all or portions of process 500 may be implemented together with processes 1300 and 1400, as described in connection with FIGS. 13-14.

In an operation 501, process 500 may identify a request by a user to access an access-restricted target resource. For example, the user may be operating on a client computing device 101 and the request may be associated with a network address for an access-restricted target resource 107-109. As discussed above in connection with FIG. 4, operations 401-405, the request from the user may be identified in various different ways (e.g., communications monitoring, receipt at a DNS server, receipt at a proxy server, receipt at an agent, receipt at a portal, etc.).

In an operation 502, process 500 may include intercepting the request before the request can reach the access-restricted target resource. For example, as discussed above in connection with operations 402-405 of FIG. 4, the request may be intercepted in various different ways (e.g., DNS redirection, proxy server redirection, agent-based redirection, portal-based redirection, etc.).

In an operation 503, process 500 may include generating a unique session identifier for the user. For example, in connection with operation 406 of FIG. 4, a unique session identifier may be generated, accessed from a database, or partially manipulated to make it unique. The unique session identifier may be unique to the user, unique to the request from the user, or both. Further, in some embodiments, the request specifies the address of the requested access-restricted target resource (e.g., IP address, MAC address, domain name, resource name, etc.).

In an operation 504, process 500 may include making available the unique session identifier to the user of the client computing device. For example, as discussed above in connection with FIG. 4, operation 407, the unique session identifier may be visually displayed to the user (e.g., via a display screen), audibly rendered (e.g., via a loudspeaker), or through other techniques.

In an operation 505, process 500 may include performing dual-mode, passwordless authentication of the user. The authentication may include confirming a result of a physical authentication of the user based on one or more unique physical characteristics of the user. For example, as discussed above in connection with FIGS. 2-4, this may include performing a biometric or biological authentication of the user, or an analysis of physical characteristics of the user or their behavior. The dual-mode, passwordless authentication may further include receiving, from the client computing device, the unique session identifier that was made available to the user. For example, if the unique session identifier is scanned by the client computing device (e.g., using a camera), it (or a representation of it) may be returned back to the security server 103.

Further, the dual-mode, passwordless authentication may further include an operation 506 of validating the received unique session identifier with respect to the result of the physical authentication. Thus, for example, the identity of the user may be confirmed both in terms of their physical authentication and also in terms of their ability to return a received unique session identifier. Further, as discussed above, the authentication may also include providing personal identification information (e.g., as stored on the client computing device) to the security server 103, which is further used to authenticate the user. As discussed above, the dual-mode, passwordless authentication may perform each component of the authentication of the user simultaneously or close-in-time. In this manner, the user is authenticated in terms of their physical presence, and also their current presence in front of (or operation of) the client computing device. Accordingly, in an operation 508, process 500 confirms, based on the dual-mode, passwordless authentication of the user, the identity of the user and the user's current use of the client computing device.

As illustrated in FIG. 5, if either or both of operations 505 and 506 are not successful for authenticating the user of the client computing device, access may be denied in an operation 507. In other words, the security server 103 may determine not to facilitate or establish a connection between the client computing device and the requested access-restricted target resource 107-109.

On the other hand, if the authentication in operations 505 and 506 is successful, operation 509 may include permitting, based on the confirmation, the user to access the access-restricted target resource. For example, as discussed above in connection with operation 410 of FIG. 4, the security server 103 may establish a secure tunnel between the client computing device 101 and the requested access-restricted target resource 107-109, and may further log the user into an account associated with the requested access-restricted target resource 107-109.

Figure 6:
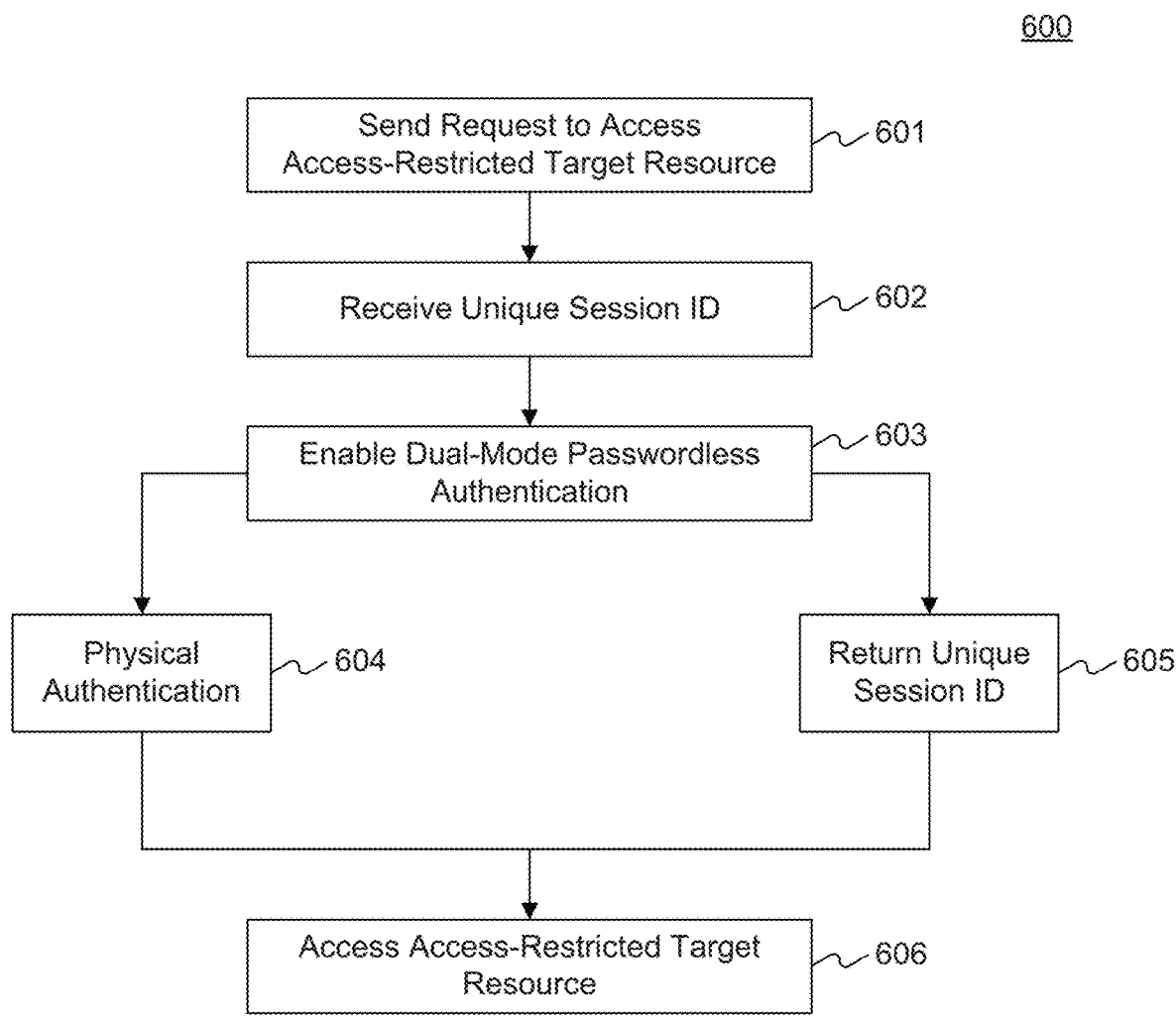
FIG. 6 is a further flowchart of passwordless authentication of a user, in accordance with disclosed embodiments.

FIG. 6 is a further flowchart of a process 600 for passwordless authentication of a user consistent with disclosed embodiments. Similar to processes 400 and 500, process 600 may be implemented in accordance with the systems of FIGS. 1 or 7-10. All or some of the steps in process 600 may further be implemented with processes 1300 and 1400, as discussed below.

In an operation 601, process 600 may include sending a request, from the client computing device, for a user of the client computing device to access an access-restricted target resource. For example, as discussed above in connection with operation 401 of process 400, and operation 501 of process 500, the request may be associated with a network address (e.g., IP address, MAC address, resource name, etc.) for the access-restricted target resource.

Process 600 may also include an operation 602 of receiving, from a security server and in response to the request, a unique session identifier for the user. For example, as discussed above regarding operation 406 of process 400, and operation 503 of process 500, the unique session identifier may be created or accessed by security server and sent to the client computing device for display or rendering to the user.

In an operation 603, process 600 may include performing steps to enable dual-mode, passwordless authentication of the user. As discussed above in connection with operations 408 and 409 of process 400, and operations 505-508 of process 500, the steps may include performing a physical authentication of the user based on one or more unique physical characteristics of the user, and returning, to the security server for validation with respect to a result of the physical authentication, the received unique session identifier. Further, as discussed above, the client computing may also send to the security server personal information associated with the user (e.g., name, title, contact information, etc.) and the network address of the access-restricted target resource the user is attempting to access. As illustrated in process 600, the physical authentication may occur in operation 604 (e.g., based on physical authentication hardware and software on the client computing device) and the unique session identifier may be returned in operation 605.

In operation 606, conditional on a successful dual-mode, passwordless authentication of the user by the security server, process 600 may also include accessing the access-restricted target resource. For example, the client computing device may directly access the requested access-restricted target resource, may access the access-restricted target resource through a secure tunnel established by the security server, or may connect to the requested access-restricted target resource through other techniques (e.g., REMOTE DESKTOP PROTOCOL (RDP), APPLE REMOTE DESKTOP, CHROME REMOTE DESKTOP, etc.). The user may then interact with the requested access-restricted target resource in a secure, seamless manner, and without having been required to provide a password for such access.

In several of the above embodiments, the described techniques used as an example implementation an enterprise with network resources, where users (e.g., employees or account holders) may seek access to the resources. Nevertheless, as discussed below in connection with FIGS. 7-10, other implementations are possible as well. The exemplary implementations of FIGS. 7-10 are also possible implementations of the methods described in connection with FIGS. 13-14, below.

Figure 7:
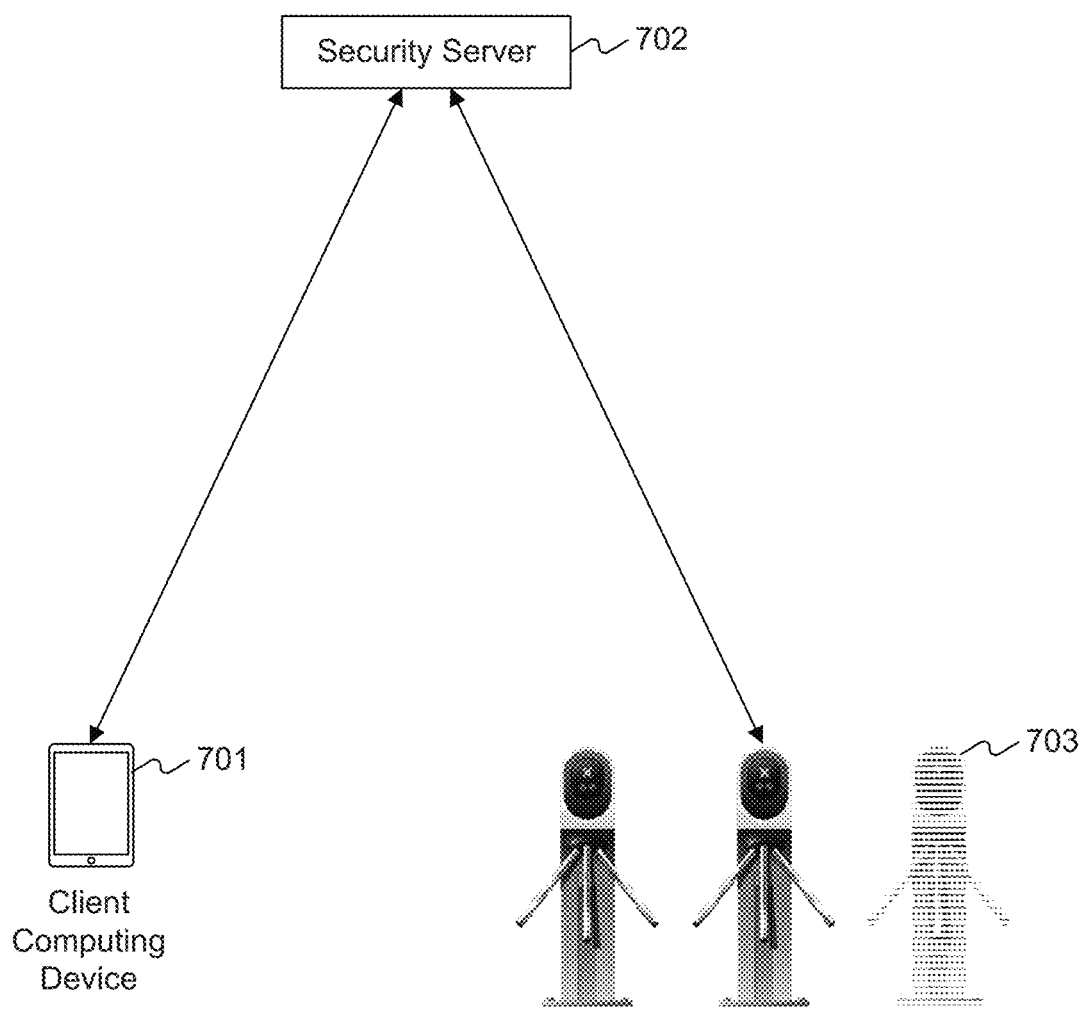
FIG. 7 is an illustration of an exemplary system for passwordless authentication of a user at a building security location, in accordance with disclosed embodiments.

FIG. 7 is an illustration of an exemplary system 700 for passwordless authentication of a user at a building security location consistent with disclosed embodiments. For example, a user of client computing device 701 may seek access to an access-restricted building through a security perimeter 703 (e.g., turnstiles, elevator, secure door, escalator, etc.). In such an implementation, the client computing device 701 may be, for example, a smartphone, wearable device, employee identification device, etc. When the user approaches the security perimeter 703, the client computing device 701 may transmit to (or receive from) the security perimeter 703 a communication indicating that the user is seeking access beyond the security perimeter 703.

Consistent with the embodiments described above, the request from the client computing device 701 may include personal information associated with the user (e.g., name, title, contact information, etc.) and an address (e.g., IP address, MAC address, Bluetooth ID, resource name, etc.) of the security perimeter 703 device it is communicating with. Alternatively, the request may be addressed to security server 702. If the request is not addressed to security server 702, it may be intercepted through various different techniques, as discussed above, and rerouted to security server 702.

Once the request is received at security server 702, a process of dual-mode, passwordless authentication of the user may be performed. As discussed above, this may involve a physical authentication of the user (e.g., using a camera or fingerprint function on the client computing device 701 or similar components integrated into security perimeter 703 itself) and the user returning a unique session identifier (e.g., barcode, QR code, image, color, etc.) that it receives from security server 702. As discussed above, the authentication may also be based on the user's identity, as confirmed through personal information sent from client computing device 701 to security server 702. If the dual-mode, passwordless authentication of the user is unsuccessful, access beyond the security perimeter 703 may be denied, while a successful authentication may result in security server 702 permitted the user access beyond the security perimeter 703.

Figure 8:
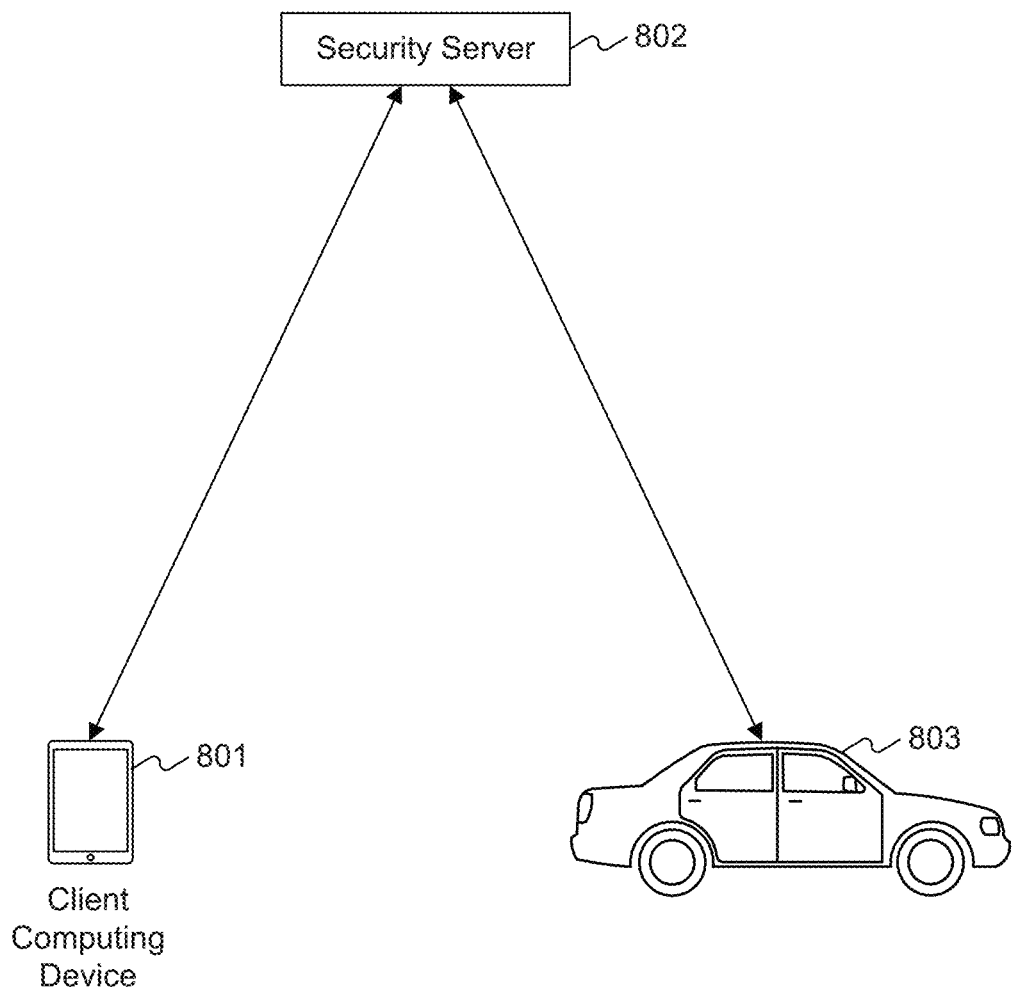
FIG. 8 is an illustration of an exemplary system for passwordless authentication of a user at a vehicle, in accordance with disclosed embodiments.

FIG. 8 is an illustration of an exemplary system 800 for passwordless authentication of a user at a vehicle consistent with disclosed embodiments. For example, a user of a client computing device 801 may seek access to operate a vehicle 803 (e.g., turn the vehicle on) or to perform a function within the vehicle (e.g., download a software update, access navigation software, make an in-vehicle purchase, etc.). In such embodiments, the client computing device 801 may be, for example, a smartphone, wearable device, key fob device, part of the vehicle 803's infotainment system, etc.

When the user of client computing device 801 seeks to operate the vehicle 803, or a function within the vehicle 803, the client computing device 801 may send to (or receive from) the vehicle a communication indicating that the user is seeking such access. As discussed above, the request may be addressed to the vehicle 803 or to security server 802. If the request is not addressed to security server 802, it may be intercepted and rerouted to security server 802, consistent with above embodiments.

Once the request is received by security server 802, a process of dual-mode, passwordless authentication of the user may be performed. For example, this may include a physical authentication of the user (e.g., using a camera or sensor built into the client computing device 801 or into the vehicle 803). The authentication may also involve the user returning a unique session identifier that it receives from the security server and/or validating personal information received from the client computing device 801 regarding the user's identity. If the dual-mode, passwordless authentication is successful, the user may be permitted access to the requested operation of the vehicle 803. Otherwise, such access may be denied.

Figure 9:
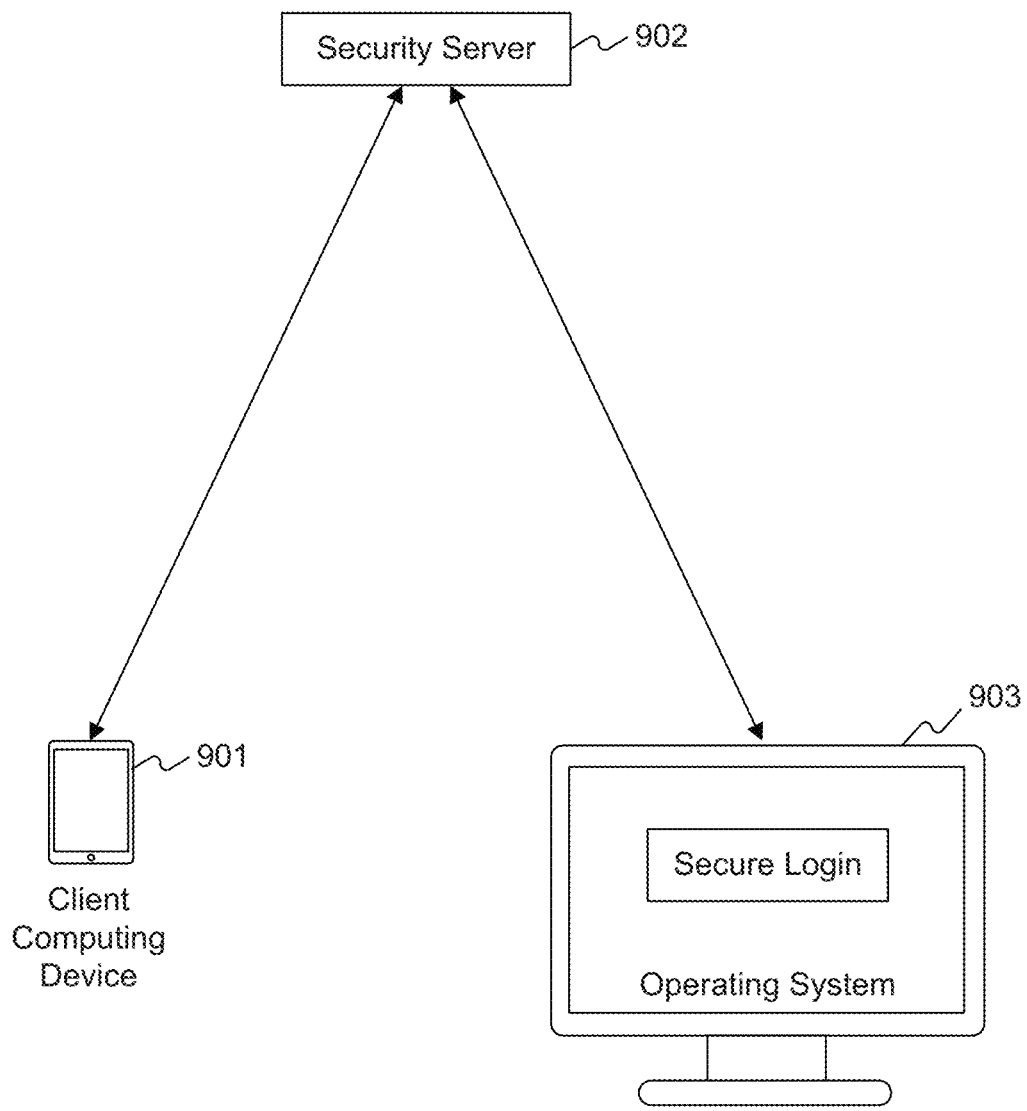
FIG. 9 is an illustration of an exemplary system for passwordless authentication of a user at a computing device, in accordance with disclosed embodiments.

FIG. 9 is an illustration of an exemplary system 900 for passwordless authentication of a user at a computing device consistent with disclosed embodiments. In such embodiments, a user of a client computing device 901 may be seeking to log into a computing device 903, such as a laptop, tablet, personal computer, etc. The computing device 903 and client computing device 901 may the same machine or different machines.

Rather than require the user to provide a password to log in to the operating system on computing device 903, the user may be authenticated in a dual-mode, passwordless technique, as discussed above. For example, the user may send a request to log in to the computing device 903, which may be received at the security server 902 or computing device 903. If received at the computing device 903, the request may be intercepted and rerouted to the security server 902, as discussed above.

A process of dual-mode, passwordless authentication of the user may then occur, including a physical authentication of the user (e.g., using a camera, sensor, or other component of client computing device 901) and prompting the user to return a unique session identifier that security server 902 sent to the client computing device. For example, the user may perform the physical authentication on their client computing device 901, while substantially at the same time receiving a QR code from security server 902, optically scanning the QR code using the client computing device 901, and returning the decoded QR code (or a representation of it) to security server 902. As discussed above, the authentication may also be based on personal information regarding the user's identity (e.g., received from a profile stored on the client computing device 901). If the authentication of the user is successful, the user may be logged in to the operating system on computing device 903. Otherwise, access to the operating system may be denied.

Figure 10:
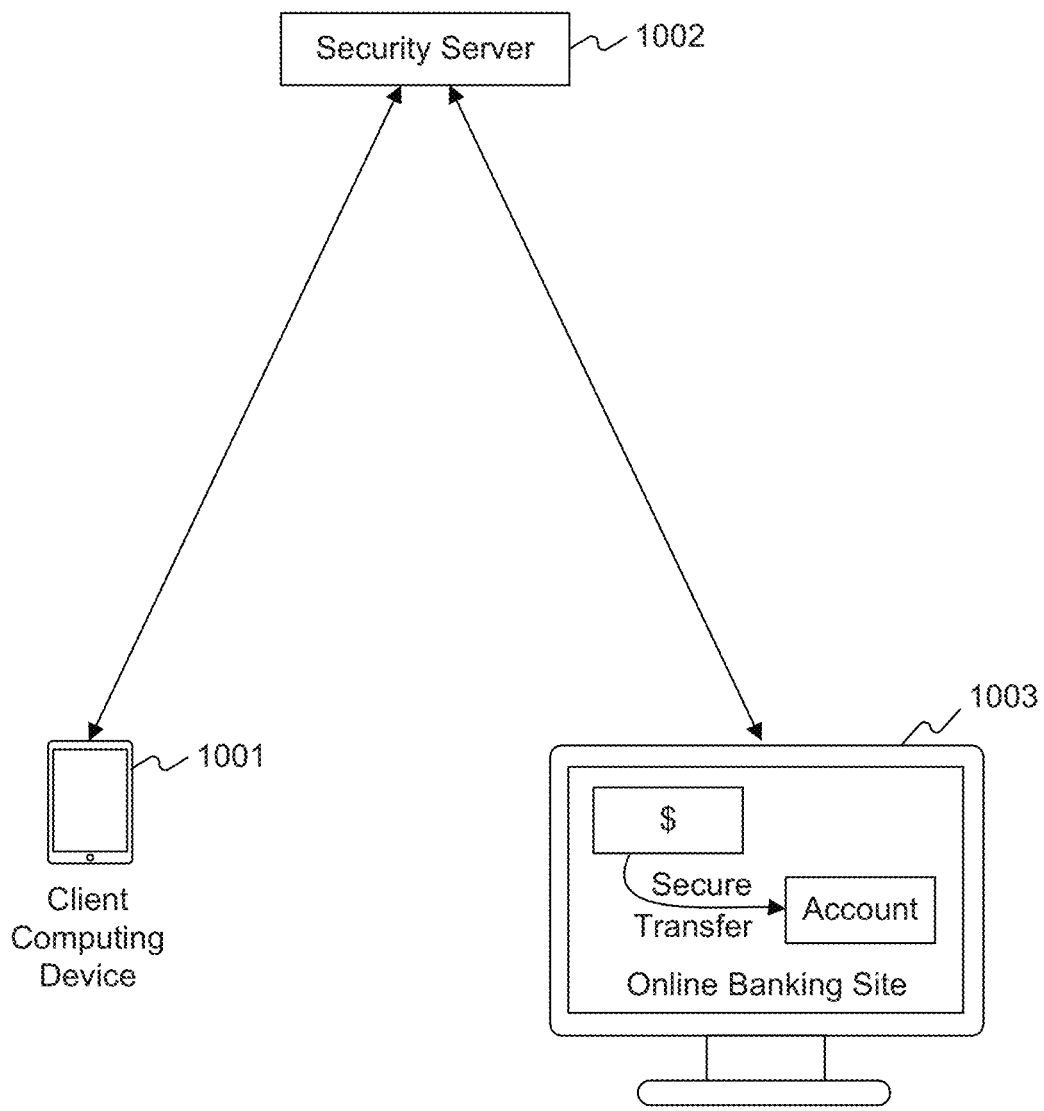
FIG. 10 is an illustration of an exemplary system for passwordless authentication of a user performing a secure transaction, in accordance with disclosed embodiments.

FIG. 10 is an illustration of an exemplary system 1000 for passwordless authentication of a user performing a secure transaction consistent with disclosed embodiments. For example, the user may be operating on a client computing device 1001 and seeking to perform a transaction with a third-party 1003 requiring authentication of the user. The transaction may involve, for example, an e-commerce purchase, personal loan, mortgage, credit application, etc.

When the user of client computing device 1001 seeks to participate in a transaction with third-party 1003, it may send a request to third-party 1003 (e.g., a request to a particular server, a request to participate in a transaction, a request to complete a transaction, etc.). The request may be received by security server 1002, or intercepted and rerouted to security server 1002.

A process of dual-mode, passwordless authentication of the user may then occur, including a physical authentication of the user, and the user returning a unique session identifier that it received from the security server 1002. Illustrations of how the dual-mode authentication may occur and provided, in exemplary form, in FIG. 3 above. In some embodiments, the user is further authenticated in terms of their identity, as confirmed based on personal information provided from client computing device 1001 to security server 1002. If the authentication of the user is successful, the user may be permitted to engage in the requested transaction with third-party 1003. Otherwise, permission may be denied.

Figure 11:
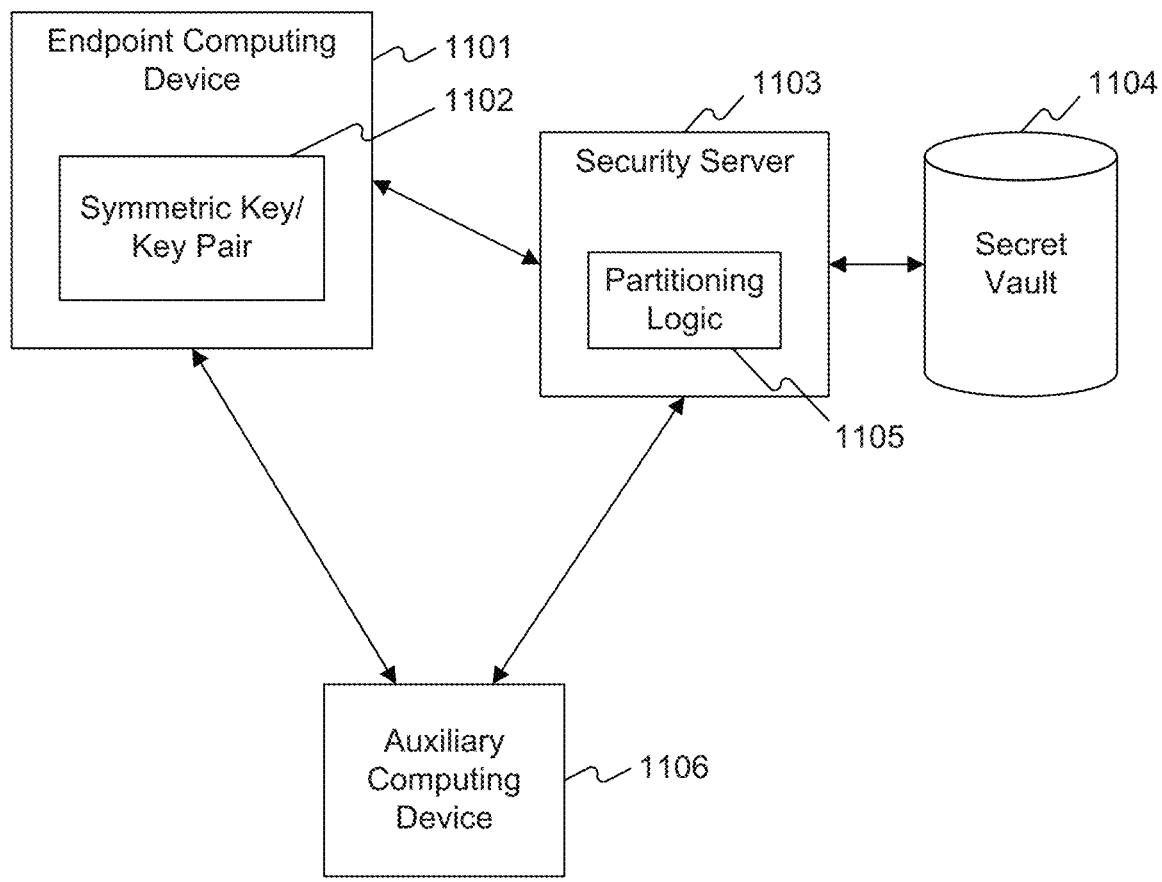
FIG. 11 is an illustration of an exemplary system for secure and distributed provisioning of a secret required to access a secure resource, in accordance with disclosed embodiments.

FIG. 11 is an illustration of an exemplary system 1100 for secure and distributed provisioning of a secret required to access a secure resource. System 1100 may be implemented to practice the methods described above (e.g., processes 400, 500, 600), as well as processes 1300 and 1400 as described below. Further, system 1100 may be implemented in the system environments of systems 700, 800, 900, and 1000, as described above, among others.

System 1100 may include an endpoint computing device 1101. The endpoint computing device 1101 may be a resource that a user is attempting to access, or may be a computing device configured to permit the user access to a separate resource. For example, as discussed above in connection with FIG. 1, endpoint computing device 1101 may be, or may permit access to, secure resources such as database 107, sites or pages 108, or server 109. Further, as discussed above, endpoint computing device 1101 may permit access to a secure location, space, enclosure, elevator, building, vehicle, appliance, or other device. In some embodiments, endpoint computing device 1101 may also include a memory storing one or more cryptographic keys 1102. For example, the cryptographic keys 1102 may include one or more symmetric keys based on a symmetric key algorithm such as Data Encryption Standard (DES), Triple DES (TDES), Advanced Encryption Standard (AES), CAST-128, or others. In embodiments where endpoint computing device 1101 stores one or more asymmetric keys 1102 (e.g., part of a public/private key pair), the key pair may be developed based on an algorithm such as Diffie-Hellman (DH), Digital Signature Standard (DSS), Rivest-Shamir-Adleman (RSA), or various others. Consistent with embodiments below, endpoint computing device 1101 may share a cryptographic key (e.g., a symmetric key, or a public key) with security server 1103, such that security server 1103 may encrypt portions of a secret using the cryptographic key.

Security server 1103 may be a server separate from endpoint computing device 1101 that is configured to access secrets from storage (e.g., internal storage, a secret generator, or secret vault 1104). For example, consistent with the discussion regarding FIG. 1 above, security server 1103 may be security server 103, and vault 1104 may be vault 106. In some embodiments, security server 1103 includes secret partitioning logic 1105, which defines one or more techniques to split or divide a secret into portions. Partitioning logic 1105 may be configured to divide a secret (e.g., a token, password, hash, certificate, or other type of secret) in to "N" pieces according to various techniques. For example, partitioning logic may divide the secret into N pieces at the bit, byte, or kilobyte level, or at other levels of granularity, such that each of the N pieces has exactly (or approximately) the same size. Further, in some embodiments a secret splitting algorithm such as Shamir's secret-sharing scheme, Blakley's scheme, or various other types of schemes may be used to split the secret into N pieces. Alternatively, in some embodiments the secret splitting is performed by the vault 1104.

System 1100 also includes one or more auxiliary computing devices 1106. As described above in connection with FIG. 1, auxiliary computing devices 1106 may be personal computing devices 101 accessible to a user seeking access to a secure resource. The techniques discussed below may involve the user accessing one auxiliary computing device 1106 or multiple such devices. Such auxiliary computing devices 1106 may have some or all of the components described in FIG. 2. When a user of an auxiliary computing device 1106 seeks access to an access-protected resource (e.g., endpoint computing device 1101, or a resource protected by endpoint computing device 1101), endpoint computing device 1101 may send a request or prompt to security server 1103 to fetch a secret required for the user's requested access. As described further below, security server 1103 may retrieve the secret (e.g., internally or from vault 1104) or generate the secret, and split the secret into N portions based on partitioning logic 1105. One or more of the portions may be provided to the endpoint computing device 1101, while one or more portions are separately provided to the auxiliary computing device 1106. Alternatively, where there are multiple auxiliary computing devices 1106, each may receive one or more portions of the secret.

After the auxiliary computing device provides its one or more portions of the secret to the endpoint computing device 1101 (e.g., via near-field wireless communications, visually, audibly, or using other techniques described below), or each of the auxiliary computing devices 1106 does so, the endpoint computing device 1101 may combine the portions to form the complete secret. The complete secret may then be verified, either by endpoint computing device 1101 itself or by security server 1103, and based on a successful verification the user may be permitted to access the requested access-protected resource.

Figure 12:
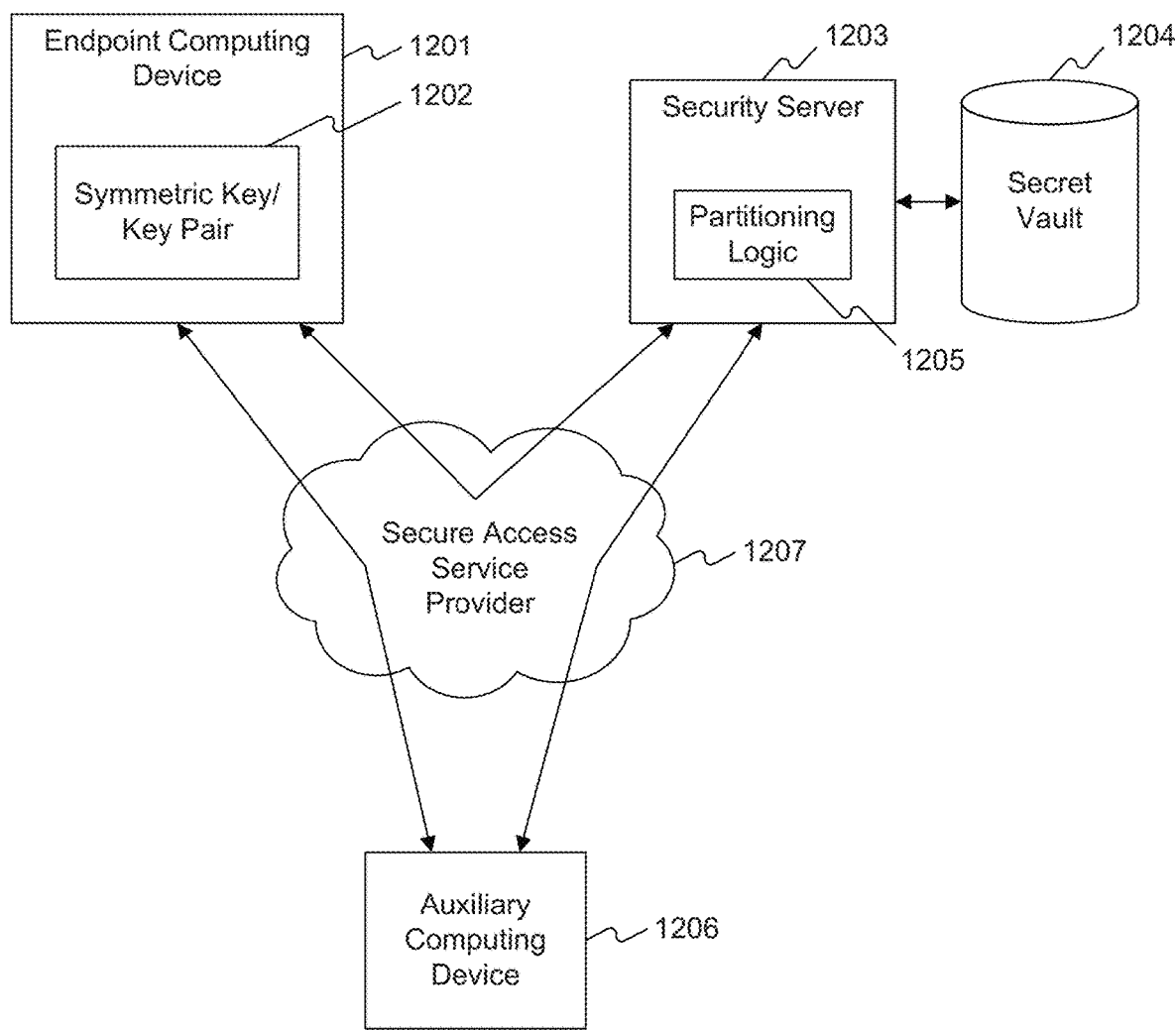
FIG. 12 is illustration of an exemplary system with a secure access service provider providing secure and distributed provisioning of a secret required to access a secure resource, in accordance with disclosed embodiments.

FIG. 12 is an illustration of an exemplary system 1200 with a secure access service provider providing secure and distributed provisioning of a secret required to access a secure resource, in accordance with disclosed embodiments. System 1200 is similar to system 1100 in many respects. In particular, endpoint computing device 1201 corresponds to endpoint computing device 1101, cryptographic keys 1202 correspond to cryptographic keys 1102, security server 1203 corresponds to security server 1103, vault 1204 corresponds to vault 1104, partitioning logic 1205 corresponds to partitioning logic 1105, and auxiliary computing device 1206 corresponds to auxiliary computing device 1106. According to system 1200, however, a secure access service provider 1207 intermediates access between the endpoint computing device 1201, security server 1203, and one or more auxiliary computing devices 1206.

Secure access service provider 1207 may be a server located on-premises (e.g., where the user is seeking to access a secure resource), integrated into software of the endpoint 1201, or remote (e.g., in a separate network, which may be an enterprise network, a cloud-based network, etc.). Communications between the secure access service provider 1207 and each of the endpoint computing device 1201, security server 1203, and auxiliary computing device 1206 may take several forms. For example, the communications may occur over an HTTP/S connection, a secure tunnel (based on Secure Shell, IPSec, SSTP, etc.), a point-to-point connection, or via a direct connection (wired or wireless). Further, secure access service provider 1207 may be configured as a proxy service where, as discussed above, traffic may be intercepted and routed through secure access service provider 1207 if a request for access to an access-protected resource is detected. Consistent with the following discussion, processes 1300 and 1400 may be implemented in the environment of system 1100 or 1200. If system 1200 is implemented, secure access service provider 1207 itself may perform the secret splitting and provisioning described below, while in system 1100 security server 1103 may perform the secret splitting and provisioning functionality.

Figure 13:
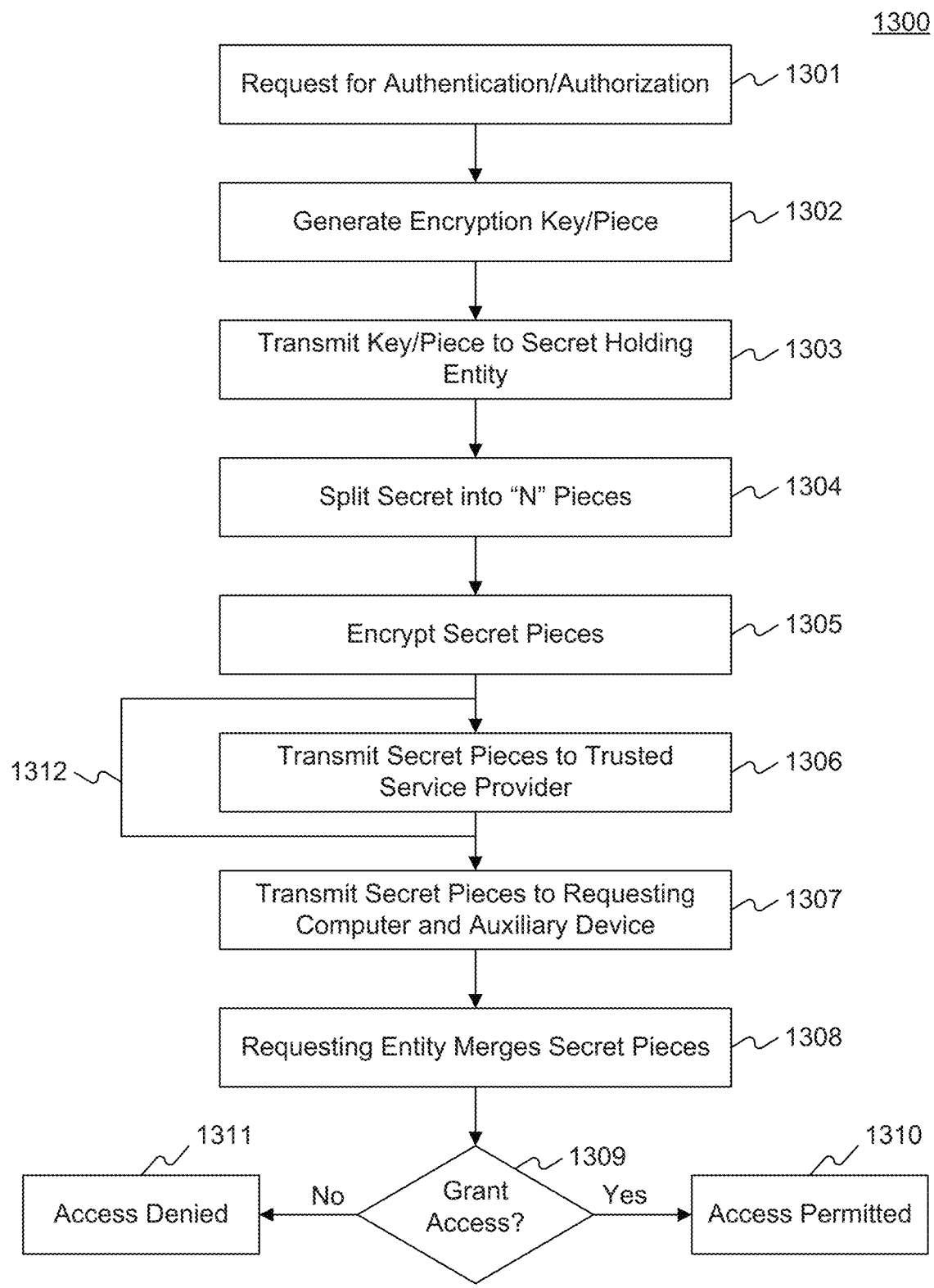
FIG. 13 is a flowchart illustrating an exemplary process for secure and distributed provisioning of a secret required to access a secure resource, in accordance with disclosed embodiments.

FIG. 13 illustrates an exemplary process 1300 for secure and distributed provisioning of a secret required to access a secure resource. As discussed above, process 1300 may be performed in the system environments described in connection with FIGS. 1 and 7-10. Further, process 1300 may be performed together with processes 400, 500, or 600, as discussed above. For example, in some embodiments once the user has been authenticated, at least initially, based on biometric information as discussed in connection with processes 400, 500, or 600, then process 1300 may provide for the retrieval and provisioning of a secret. Alternatively, process 1300 may be performed independent and separate of processes 400, 500, or 600.

In operation 1301, process 1300 may include identifying a request associated with a user seeking access to a secured resource. Operation 1301 may include receiving a request for such access from the user, receiving a communication from an endpoint computer (e.g., endpoint computing device 1101 or 1201), or detecting that the user has opened an application that will require authentication of the user or authorization for its functionality. As an example, when a user logs onto their personal computing device, or opens a particular application, operation 1301 may treat such activities as a request for authentication or authorization. Further, in some embodiments, operation 1301 may involve detecting the location of a user in proximity to a resource that requires secure access. For example, a user approaching an RFID access point at a building may be detected as they approach the access point (e.g., via WiFi or cellular communications from the user's personal computing device), and operation 1301 may classify the user's approaching as a request for authentication or authorization to enter through the access point. Similarly, a user approaching a vehicle may be detected, and operation 1301 may classify the approaching as a request for the user to be authenticated or to be authorized to access the vehicle.

In an operation 1302, process 1300 may include generating or accessing one or more encryption keys. For example, with reference to FIG. 12, an endpoint computing device 1201 may access a previously created symmetric cryptographic key or asymmetric (public/private) key pair from key memory 1202. Alternatively, endpoint computing device 1201 may generate such keys. In some embodiments, operation 1302 of accessing or generating cryptographic keys may be performed in response to the request in operation 1301. Alternatively, operation 1302 may be performed before operation 1301 (e.g., during initialization or building of endpoint computing device 1201, during a periodic or as-needed refresh of cryptographic keys stored in key storage 1202, etc.).

Operation 1303 may involve transmitting the key accessed in operation 1302 to a secret holding entity. For example, with reference to FIG. 11, endpoint computing device 1101 may transmit the key (e.g., symmetric key, or public key from a private/public key pair) to security server 1103. Alternatively, with reference to FIG. 12, endpoint computing device 1201 may transmit the key (e.g., symmetric key, or public key from a private/public key pair) to security server 1203 and/or secure access service provider 1207.

In operation 1304, a secret (e.g., token, certificate, hash, password, etc.) may be retrieved or generated, and split into "N" pieces. For example, in system 1100 security server 1103 may generate a secret, access a secret from local storage, or retrieve a secret from vault 1104. The secret may be retrieved as discussed above in connection with FIG. 1 with reference to security server 103 and vault 106. Further, in system 1200, security server 1203 or secure access service provider 1207 may generate the secret, or access a previously stored secret, either locally or from vault 1204. Once the secret has been accessed, it may be split into N pieces according to a partitioning or dividing scheme, as discussed above. Consistent with the discussion above, the splitting may be performed by security server 1103 or 1203 (e.g., using partitioning logic 1105 or 1205), by secure access service provider 1207, or by secure vault 1104 or 1204. In embodiments with only one auxiliary computing device 1106 or 1206, a first portion may be provided to the auxiliary computing device 1106 or 1206 and a second portion may be provided to the endpoint computing device 1101 or 1201. Alternatively, in embodiments with more than one auxiliary computing device 1106 or 1206, each of the auxiliary computing devices 1106 or 1206 may receive one or more portions of the secret.

In some embodiments, operation 1304 of affirmatively splitting the secret is not performed. For example, according to some embodiments the secret may already be split (e.g., by an external service or third-party entity) when it is accessed or generated. This may happen, for example, if the secrets are managed by a trust service or trust entity (e.g., entity that provisions the vault 1104/1204). According to such embodiments, process 1300 may be performed without affirmatively splitting the secret into two or more portions.

The transfer of the portions of the secret to the endpoint computing device 1101/1201 and one or more auxiliary computing devices 1106/1206 may occur using a single communications technique or multiple different communications technique. As one example, a first portion of the secret may be transmitted to the endpoint computing device over a local area network connection (e.g., Ethernet-based), while a second portion of the secret may be transmitted to the auxiliary computing device using a combination of cellular and WiFi protocols. In such a situation, the auxiliary computing device may transfer its portion of the secret to the endpoint computing device using a Bluetooth or RFID protocol. As another example, the first portion of the secret may be transmitted to the endpoint computing device using a cellular protocol (e.g., 4G, 5G, etc.), and the second portion of the secret may be transmitted to the auxiliary computing device via a WiFi protocol. The auxiliary computing device may then communicate its portion of the secret to the endpoint computing device using visual techniques (e.g., a display screen on the auxiliary computing device) or audible techniques (e.g., a speaker of the auxiliary computing device), or by prompting the user to speak the portion of the secret. Numerous different types of communications techniques, and combinations of such techniques, may be used for transmitting the portions of the secrets to the endpoint computing device and auxiliary computing device, and from the auxiliary computing device to the endpoint computing device.

In operation 1305, the secret may be encrypted. The encryption may occur based on the entirety of the secret (e.g., before any splitting) or after the splitting based on each portion of the secret. In some embodiments, the portions of the secret are encrypted using the cryptographic key provided by the endpoint computing device 1101 or 1201. For example, as discussed above, the endpoint computing device 1101 or 1201 may transmit a symmetric key, or the public key from a private/public key pair, to the security server 1103 or 1203 (or to secure access service provider 1207). The portions of the accessed secret may be encrypted using that received cryptographic key.

In operation 1306, the encrypted portions of the secret may be transmitted to secure access service provider 1207. Alternatively, if the encryption occurs at the secure access service provider 1207 itself, the (unencrypted) secret portions may be received at secure access service provider 1207, and then encrypted using the cryptographic key provided by the endpoint computing device 1101 or 1201.

According to operation 1307, the encrypted portions of the secret may be provisioned to the endpoint computing device 1101 or 1201 and to the one or more auxiliary computing devices 1106 or 1206. For example, at least a first portion of the secret may be transmitted to the endpoint computing device 1101 or 1201, while at least a second portion of the secret may be transmitted, separately, to the auxiliary computing device 1106 or 1206. Notably, using this technique, even if an attacker gained access to the endpoint computing device 1101 or 1201, they would not be able to obtain access to the secure resource because they would not posses the entire secret (i.e., all of its portions). Similarly, even if an attacker was able to compromise the auxiliary computing device 1106 or 1206 and steal its portion(s) of the secret, the attacker would still possess less than the entire secret. Also, in this situation, because the secret portion(s) sent to the auxiliary computing device 1106 or 1206 may be encrypted using a cryptographic key supplied by the endpoint computing device 1101 or 1201, the attacker would not be able to decrypt the portion(s) of the secret stored on the auxiliary computing device 1106 or 1206.

In some embodiments, there may be multiple distinct auxiliary computing devices 1106 or 1206, and each may receive a different portion of the secret. For example, the endpoint computing device 1101 or 1201 may receive a first portion of the secret, a first auxiliary computing device 1106 or 1206 may receive a second portion, and a second auxiliary computing device 1106 or 1206 may receive a third portion, and so on, depending on the number of auxiliary computing devices 1106 or 1206 involved. As discussed above, the portions of the secret may be separately transmitted to each of the endpoint computing device 1101 or 1201 and the auxiliary computing devices 1106 or 1206 using a single communications technique or multiple different techniques. Further, the secrets may be transmitted according to a splitting scheme, such as Shamir's secret-sharing scheme, Blakley's scheme, or various other types of schemes. According to such techniques, while the secret may be split into N pieces, there may be a minimum number (M) of secret pieces needed such that their combination can reconstruct the original secret. In situations with a single auxiliary computing device, M may equal two (i.e., the auxiliary computing device and the endpoint computing device), whereas in situations with multiple auxiliary computing devices M may be greater than two. Operation 1312 represents a further alternative where, if there is no secure access service provider 1207 (e.g., as is the case in system 1100), the security server 1103 of 1203 may send the secret portions to the endpoint computing device 1101 or 1201 and auxiliary computing device(s) 1106 or 1206 itself.

In operation 1308, the entity requesting authentication or authorization for the user (e.g., endpoint computing device 1101 or 1201) may merge the portions of the secret that it receives. As explained above, the endpoint computing device 1101 or 1201 may receive at least one portion of the secret from the security server 1103/1203 or secure access service provider 1207. The endpoint computing device 1101 or 1201 may further receive at least another portion of the secret from the auxiliary computing device(s) 1106 or 1206.

Notably, the portion(s) of the secret may be communicated from the auxiliary computing device(s) 1106 or 1206 to the endpoint computing device 1101 or 1201 in various ways. For example, in some embodiments, the portions of the secret may be conveyed through near-field communications (e.g., RFID, Bluetooth, MIFARE, or various other standardized or proprietary protocols); through a visual display of an image, barcode, QR Code, or other pattern (e.g., a visual display screen or projection generated by the auxiliary computing device(s) 1106 or 1206 and scanned or detected by the endpoint computing device 1101 or 1201); through an audible communication (e.g., produced from a speaker of the auxiliary computing device(s) 1106 or 1206 and received by a microphone of the endpoint computing device 1101 or 1201), or through various other techniques. In other embodiments, the user of the auxiliary computing device(s) 1106 or 1206 will be presented with the portion(s) of the secret (e.g., visually or audibly) and be prompted to enter or speak the portion(s) to the endpoint computing device 1101 or 1201. In certain embodiments, a timer (e.g., implemented by endpoint computing device 1101 or 1201) may require that the user of the auxiliary computing device(s) 1106 or 1206 provide the portion(s) of the secret within a time interval, or else later-provided portion(s) of the secret will be treated as null. In some embodiments, the portion(s) of the secret transmitted from the auxiliary computing device(s) 1106 or 1206 have an expiration attribute or time-to-live, such that they are invalid or inoperable after a certain amount of time. Various other techniques for communicating the portion(s) of the secret from the auxiliary computing device(s) 1106 or 1206 to the endpoint computing device 1101 or 1201 are possible as well, including yet-to-be-developed techniques.

Regardless of how the portions of the secret are received at endpoint computing device 1101 or 1201, how many portions there are (i.e., the value "N" from the secret splitting), and how many auxiliary computing device(s)

1106 or 1206 were involved in providing them to the endpoint computing device 1101 or 1201, the endpoint computing device 1101 or 1201 may combine the portions and determine, in operation 1309, whether the secret is valid. In some embodiments, this may involve decrypting each individual portion before combining, or decrypting the combined whole of the secret. The decryption may be based on a symmetric key maintained by the endpoint computing device 1101 or 1201, or a private cryptographic key from a public/private key pair. Such a key may be the same as, or corresponding to, the key that was provided from the endpoint computing device 1101 or 1201 to the security server 1103 or 1203. If the secret is successfully verified in operation 1309, access may be granted to the requested resource in operation 1310. Alternatively, if the secret cannot be validated or is determined affirmatively to be invalid, access may be denied in operation 1311.

Figure 14:
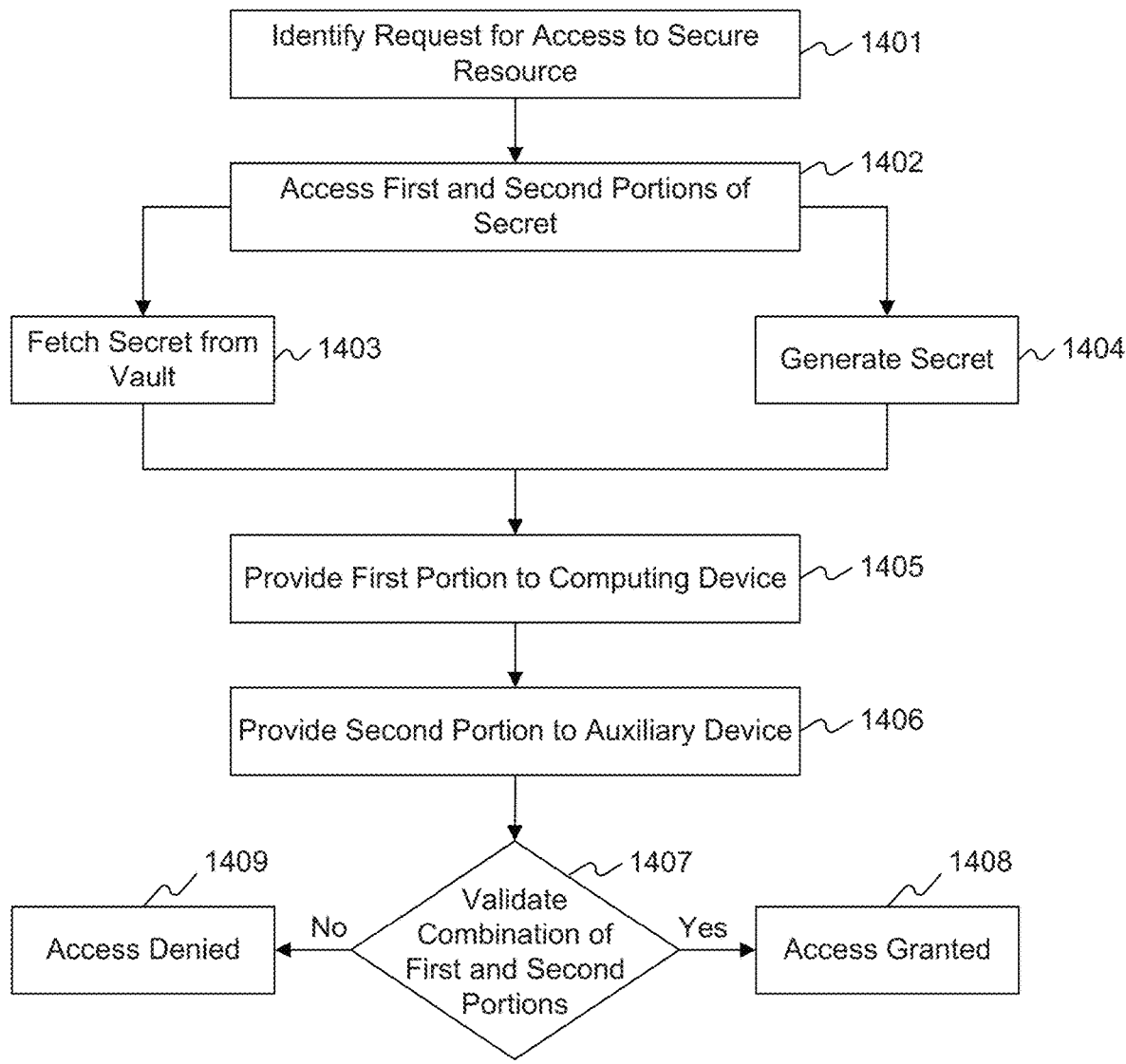
FIG. 14 is a flowchart illustrating an exemplary process for secure and distributed provisioning of a secret required to access a secure resource, in accordance with disclosed embodiments.

FIG. 14 illustrates a flowchart for an exemplary process 1400 of secure and distributed provisioning of a secret required to access a secure resource. Process 1400 may be performed in the system environments described in connection with FIGS. 1 and 7-10. In addition, process 1400 may be performed together with processes 400, 500, 600, or 1300, as discussed above. For example, in some embodiments once the user has been authenticated based on biometric information as discussed in connection with processes 400, 500, or 600, then process 1400 may enable the retrieval and provisioning of a secret. Alternatively, process 1400 may be performed independent and separate of processes 400, 500, 600, or 1300.

In an operation 1401, process 1400 may include identifying a request for a user to access a secure resource. As discussed above, the request may come directly from the user (e.g., from their auxiliary computing device), may come from the target resource (e.g., the endpoint device), may come from a detection of the user's proximity to the endpoint device, may come from the user opening a particular sensitive or secured application on their auxiliary device, etc. Because the resource to which the user is seeking access is secured, the user's access to the resource may be conditioned on a secret being made available at a computing device being accessed by the user. Without the secret (including all of its portions) being provided to the endpoint and verified, the user may be denied access to the resource.

As an example of operation 1401, the user may be attempting to access a computing device, and "unlocking" or logging in to an operating system or other application on the computing device. In such embodiments, the computing device may be the endpoint, and the user may have a separate computing device (e.g., mobile phone, tablet, smart clothing, etc.) that is the auxiliary device. As another example, the user may be attempting to access a remote server (e.g., server 109 from FIG. 1). In this situation, the endpoint may be the remove server or a separate server controlling access to the remote server, and the user may have a separate auxiliary computing device. Various other types of endpoints (e.g., servers or other devices controlling access to SaaS applications, buildings, rooms, elevators, controlled spaces, appliances, utilities, etc.) are possible, and may be used with various types of auxiliary devices (e.g., mobile phones, tablets, smart watches, smart clothing, key fobs, etc.).

In an operation 1402, process 1400 may include accessing, in response to the request, at least a first portion and a second portion of the secret. As discussed above, the accessing may including retrieving the secret from local storage at a secure server, retrieving the secret from a separate secrets vault (operation 1403), or generating the secret (operation 1404). Based on the design of the endpoint and the secure sever, the secret can be formed based on a combination of at least the first portion and the second portion of the secret. Stated differently, the secret may be generated and then split into two or more portions, or may be generated as two or more portions that can be combined to form the secret. Accordingly, as discussed above regarding process 1300, process 1400 may be performed either with or without a step of affirmatively splitting the secret into two or more portions. In either implementation, the entire secret may be required by the endpoint in order for the user to be permitted access to the requested secure resource.

As discussed above, operation 1402 may also include encrypting the portions of the secret, before or after splitting the secret into portions. The encryption may be based on a cryptographic key (e.g., symmetric or public key) provided by the endpoint computing device.

In operation 1405, at least the first portion of the secret may be provided to the endpoint computing device, while in operation 1406 at least the second portion of the secret may be provided to an auxiliary device physically accessible to the user. In some embodiments, operations 1405 and 1406 are performed concurrently, or close to simultaneously. As discussed above, various communications protocols may be used to transmit the first and second portions of the secret, such as an HTTP/S connection, a secure tunnel (based on Secure Shell, IPSec, SSTP, etc.), a point-to-point connection, a direct connection (wired or wireless), etc. The same or different protocols may be used to transmit the first and second portions of the secret. Further, as noted above, in some implementations there may be more than one auxiliary device to which to send portions of the secret.

Consistent with above embodiments, the second portion of the secret (and additional portions, if any) is configured to be conveyed by the user from the auxiliary device to the computing device and combined with at least the first portion of the secret to form the complete secret. The user may convey the second (or additional) portion of the secret to the computing device in various ways. As discussed above, examples include near-field communications (e.g., RFID, Bluetooth, etc.), visual or light-based communications, auditory communications, spoken communications, keypad input, etc.

Once the endpoint computing device receives the various portions of the secret (i.e., from at least the security server and one auxiliary computing device), the endpoint computing device may decrypt the portions (before or after recombining the portions). The decryption may be based on a key (e.g., symmetric or private key) held by the endpoint computing device. Before or after the decryption, the endpoint computing device may attempt to combine the portions to form the complete secret. If the complete secret is formed and validated in operation 1407, the user may be permitted access to the secure resource in operation 1408. If the secret cannot be formed or is determined to be invalid (e.g., because not all portions were provided, decryption was unsuccessful, a portion or the secret as a whole expired, etc.), access may be denied to the user in operation 1409. In some embodiments, the validation operation 1407 is performed locally by the endpoint computing device, while in other embodiments, the validation is performed remotely (e.g., by sending the decrypted, complete secret to the secure server for validation, or by sending the decrypted portions of the secret to the secure server for combination and validation).

Figure 15A:
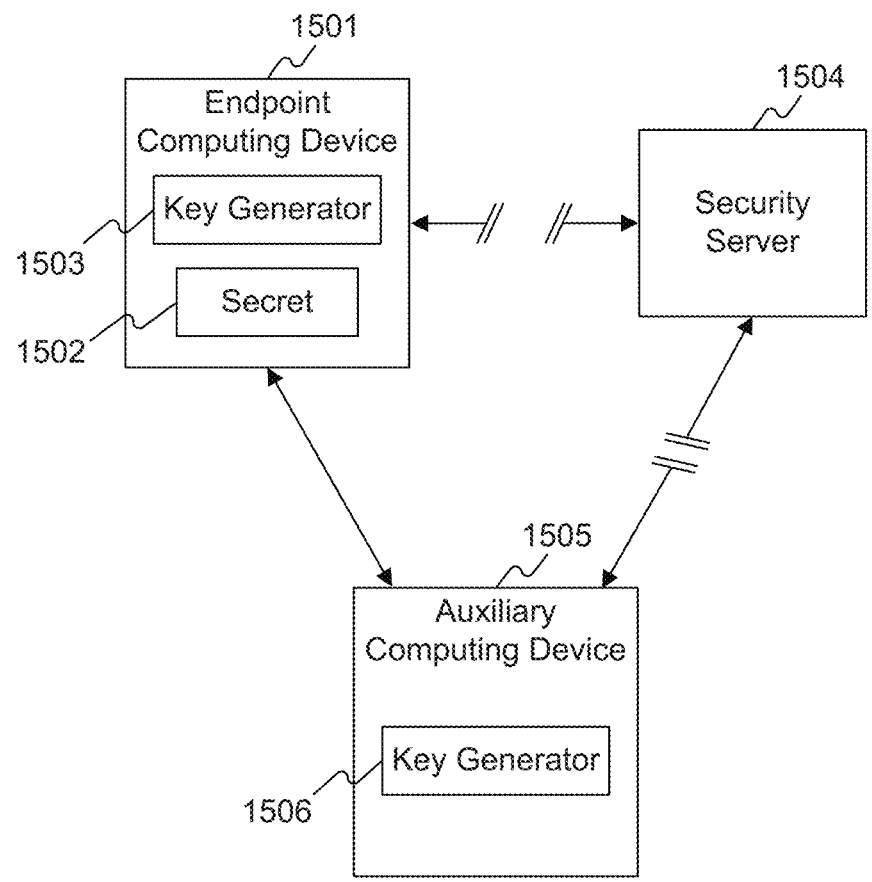
FIG. 15A is an illustration of an exemplary system including a security server for secure offline provisioning of a secret required to access a secure resource, in accordance with disclosed embodiments.

FIG. 15A is an illustration of an exemplary system 1500A for secure offline provisioning of a secret required to access a secure resource. System 1500A may be implemented to practice the methods described below (e.g., in connection with FIGS. 19 and 20). System 1500A may be similar to systems 1100 and 1200, as discussed above in connection with FIGS. 11 and 12, except that in system 1500A there is a lack of a network connection between endpoint computing device 1501 and security server 1504, and/or between auxiliary computing device 1505 and security server 1504. As discussed further below in connection with FIGS. 18A and 18B, in some embodiments there may be multiple endpoint computing devices 1501 and/or multiple auxiliary computing devices 1505.

In the system 1500A of FIG. 15A, the lack of a network connection may arise due to several potential causes. For example, if the endpoint computing device 1501 is a laptop or tablet, and the auxiliary computing device 1505 is a tablet or mobile phone, a lack of a network connection may occur when a user of these devices is on an airplane or train, in a remote area, or in another location where no Internet connection is possible. Further, a lack of a network connection may occur when the user is in a building that physically blocks or obstructs a wireless network connection. Additionally, a lack of a network connection may arise from a connection failure or equipment failure. In each of these situations, the lack of a network connection may be either a total absence of a connection or a connection with insufficient quality. Of course, the techniques of offline secret provisioning discussed below may also be practiced in environments where the user has a strong, viable network connection (e.g., Internet connection, LAN connection, etc.). In such environments, however, the techniques discussed below may be performed without utilizing or relying on such a network connection.

In system 1500A, endpoint computing device 1501 may be similar to endpoints 1101 and 1201, as discussed above in connection with FIGS. 11 and 12. Likewise, security server 1504 may be similar to security server 1103/1203, and auxiliary computing device 1505 may be similar to auxiliary devices 1106/1206. Of course, in some embodiments consistent with system 1500A, there may be no security server 1504. This type of environment, lacking a security server 1504, is illustrated in system 1500B of FIG. 15B. In other words, the processes discussed below (e.g., in connection with FIGS. 19 and 20) may be practiced either with, or without, a security server 1504 being part of systems 1500A and 1500B.

Figure 15B:
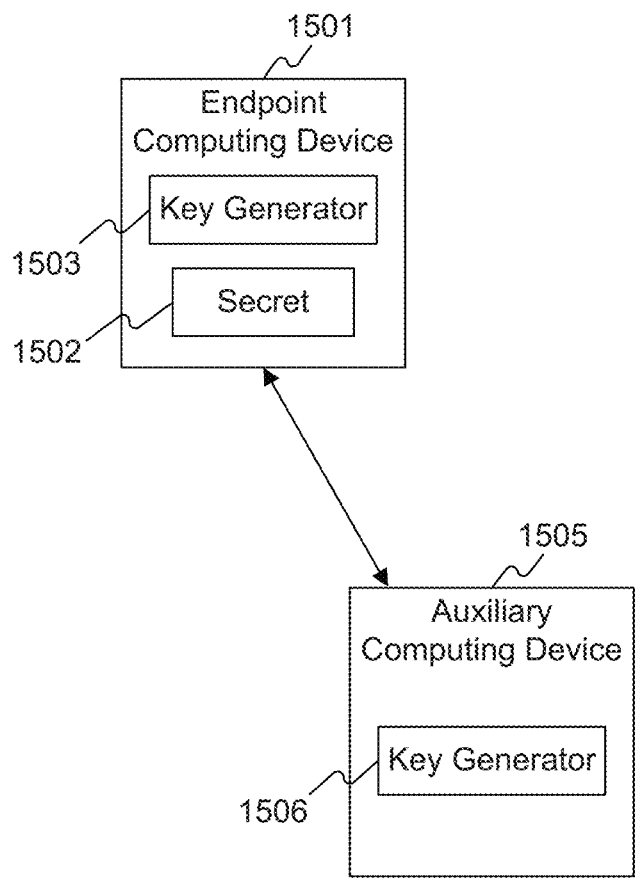
FIG. 15B is an illustration of an exemplary system without a security server for secure offline provisioning of a secret required to access a secure resource, in accordance with disclosed embodiments.

As illustrated in FIGS. 15A and 15B, endpoint computing device 1501 may include a key generator application 1503 and a secret 1502. Key generator 1503 may be configured to generate symmetric cryptographic keys and/or asymmetric cryptographic key pairs (e.g., public/private key pairs). In order to generate symmetric keys, for example, key generator 1503 may store, or have access to, algorithms such as Data Encryption Standard (DES), Triple DES (TDES), Advanced Encryption Standard (AES), CAST-128, or various others. To generate asymmetric keys, key generator 1503 may store, or have access to, algorithms such as Diffie-Hellman (DH), Digital Signature Standard (DSS), Rivest-Shamir-Adleman (RSA), or various others. In accordance with embodiments discussed below, key generator 1503 may be configured to generate keys when needed. Alternatively, keys may be already generated or received by endpoint computing device 1501. In such situations, rather than generate a key, key generator 1503 may function to access an already-generated key from memory.

Endpoint computing device 1501 may be configured to store one or more secrets 1502, which may be accessible on the endpoint computing device 1501 but not accessible (at least, in cleartext form) on the auxiliary device 1505. Such secrets 1502 may take many forms. For example, a secret 1502 may be a password, token, certificate, hash value, or various other types of credentials needed to access a secure resource. In accordance with the embodiments discussed above, and below, secrets 1502 may be used to access secure operating systems, applications, elements of data, or other types of secure resources. For example, in the embodiments discussed below, a user may practice the disclosed techniques to unlock their computer (e.g., log in) or access a particular application requiring secure access. The secret(s) 1502 required to perform these secure access functions may be stored on endpoint computing device 1501.

In additional embodiments, secret 1502 may be data or a file to be protected. For example, secret 1502 may sensitive personal information, confidential business information, or other types of sensitive information, as well as files containing such data. In such embodiments, the sensitive data or file may be protected through the encryption techniques discussed below.

Like endpoint computing device 1501, auxiliary computing device 1505 may also have a key generator 1506. Key generator 1506 may also store, or have access to, algorithms such as DES, TDES, AES, CAST-128, or others. To generate asymmetric keys, key generator 1506 may also store, or have access to, algorithms such as DH, DSS, RSA, or others. As discussed below, key generator 1506 may also be configured to generate keys when needed. Alternatively, keys may already be generated or received by endpoint computing device 1501. Accordingly, rather than generate a key, key generator 1506 may function to access an already-generated key from memory (e.g., a local hard driver or RAM of auxiliary computing device 1505).

FIGS. 16A-F represent example system arrangements 1600A-1600-F for encrypting and provisioning a secret required to access a secure resource. In these systems, endpoint computing device 1601 may be an endpoint as discussed above, and auxiliary device 1603 may be an auxiliary computing device as discussed above (e.g., in FIGS. 11, 12, and 15A-B). As an illustration, endpoint computing device 1601 may be a laptop requiring authorized access (or running an application requiring authorized access), and auxiliary device 1603 may be a user's mobile phone or tablet. Alternatively, endpoint computing device 1601 may be a smart home appliance, and auxiliary device 1603 may be a user's mobile phone or smart clothing. Various other examples and combinations are possible as well.

Figure 16A:
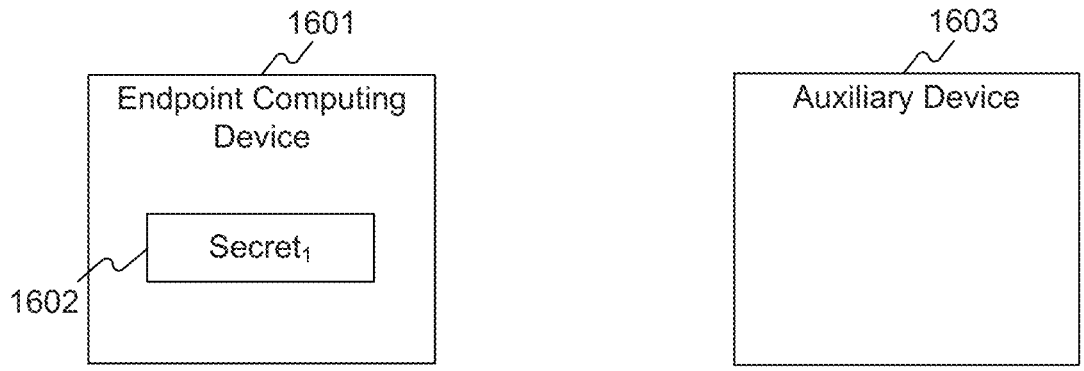
FIGS. 16A-F are illustrations of example system arrangements for encrypting and provisioning a secret required to access a secure resource, in accordance with disclosed embodiments.

As illustrated in FIG. 16A, endpoint computing device 1601 may store a secret, Secret$_1$ 1602. When the secret is originally received or input to endpoint computing device 1601, it may be in clear text (e.g., without encryption or obfuscation). The Secret$_1$ 1602 may be stored in a memory (e.g., hard drive, RAM, or secured storage area) of endpoint computing device 1601.

Figure 16B:
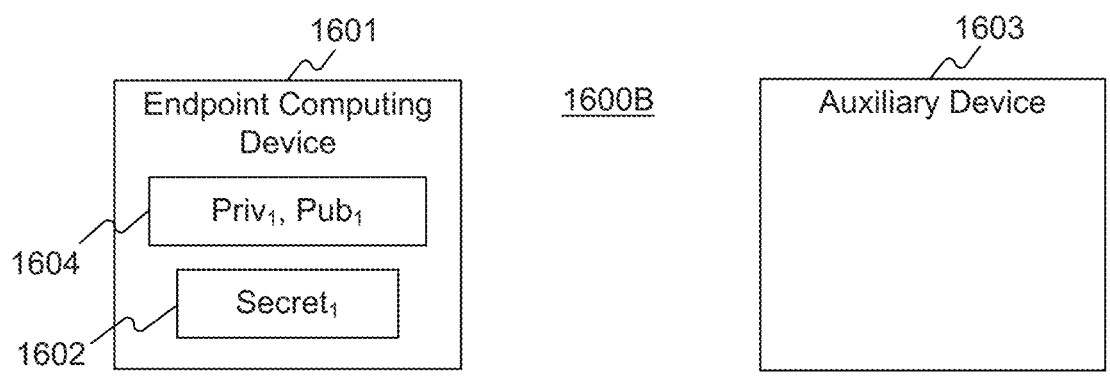

As shown in FIG. 16B, endpoint computing device 1601 may either access or generate (e.g., on demand, or upon receiving the Secret$_1$ 1602) a cryptographic key. For example, endpoint computing device 1601 may generate or access a symmetric key, or an asymmetric (e.g., public/private) key pair. In the example illustration of FIG. 16B, a public/private key pair 1604 is generated, but a symmetric key may be used in other embodiments. The key or key pair generated at the endpoint computing device 1601 may be held only by the endpoint computing device 1601 and not made available externally. In some embodiments, the key(s) accessed or generated at endpoint computing device 1601 may be limited-use keys (e.g., only valid for a defined time period, for one or more sessions, for one or more uses, for a particular handshake with the auxiliary device 1603, etc.). For example, a policy may provide that such key(s) are valid for such limited uses, and then expire or be rendered invalid.

Figure 16C:
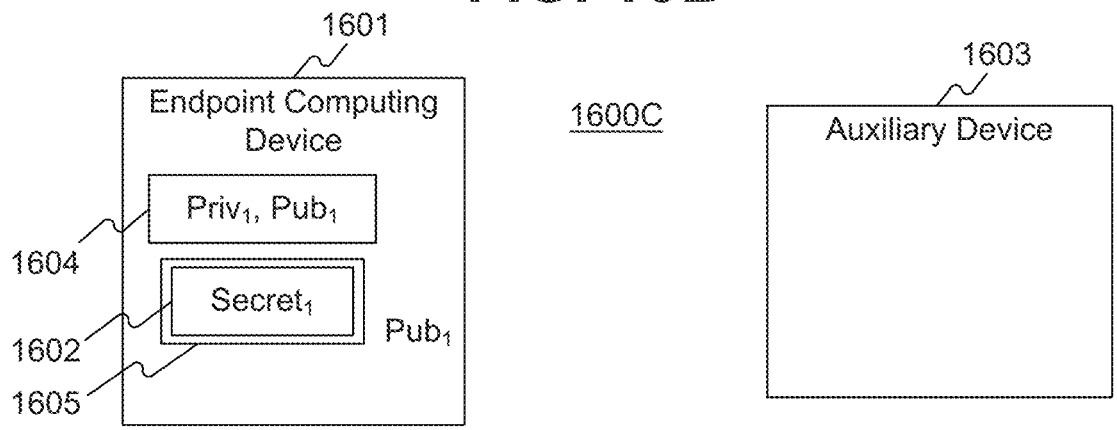

Once a cryptographic key has been generated, it may be used on the endpoint computing device 1601 to encrypt the secret, $Secret_1$ 1602. As shown in FIG. 16C, the public key from the public/private key pair 1604 is used to encrypt $Secret_1$ 1602, thus producing encrypted $Secret_1$ 1605. Of course, the encryption of $Secret_1$ 1602 may be performed with another type of key, such as a symmetric key, in other embodiments.

Figure 16D:
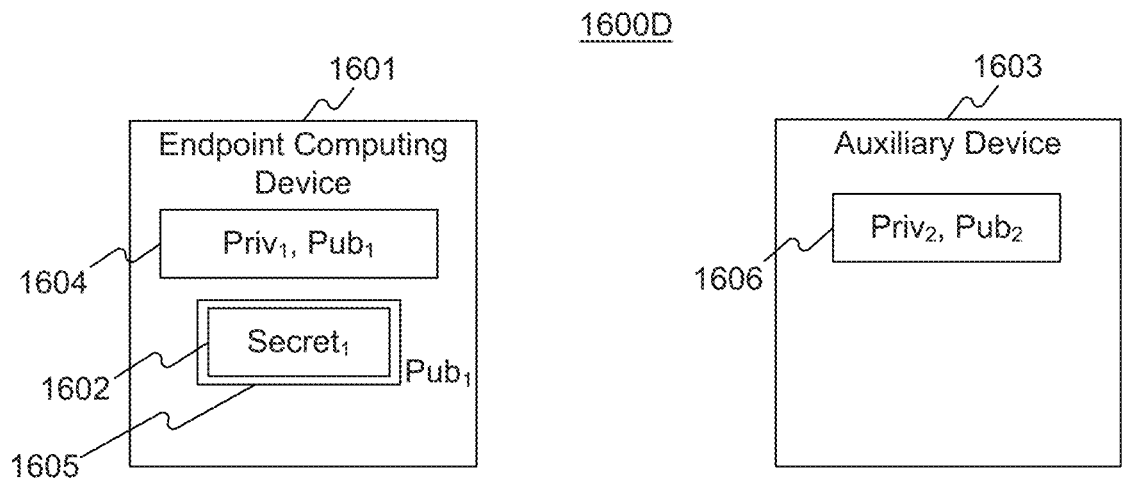

As shown in FIG. 16D, the auxiliary device 1603 itself may then access or generate a cryptographic key, such as a symmetric key or a public/private key pair. FIG. 16D illustrates an embodiment where auxiliary device 1603 generates a public/private key pair 1606. In other embodiments, a symmetric key may be accessed or generated instead.

Figure 16E:
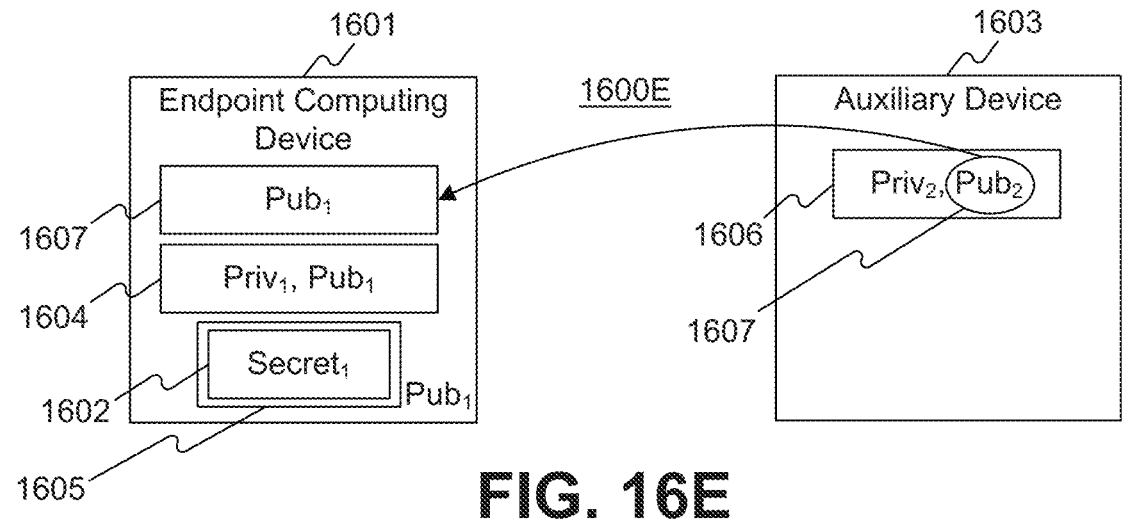

Once auxiliary device 1603 has generated the public/private key pair 1606, a public key from the pair 1606, $Pub_2$ 1607, may be transmitted to the endpoint computing device 1601, as shown in FIG. 16E. Alternatively, if a symmetric key has been generated by auxiliary device 1603, that symmetric key may be transmitted to endpoint computing device 1601. The transmission technique may take several forms. For example, the cryptographic key may be transmitted from the auxiliary device 1603 using the various near-field or short-range techniques discussed above in connection with FIGS. 2 and 3, such as bar code scanning (e.g., QR codes, or two-dimensional codes), infrared signals, Bluetooth communications, audible (e.g., vocal) communication, image recognition, etc.

The endpoint computing device 1601 may then use the received cryptographic key (e.g., $Pub_2$ 1607) to encrypt the encrypted $Secret_1$ 1605, thus producing an $Encrypted Block_1$ 1608. The $Encrypted Block_1$ 1608 is then capable of being decrypted to produce the encrypted $Secret_1$ 1605, which in turn may be decrypted to produce the $Secret_1$ 1602 itself. These decryption steps are further discussed below.

The $Encrypted Block_1$ 1608 may be cached in a memory (e.g., hard drive, RAM, secure storage, etc.) of the endpoint computing device 1601 and retained until needed. For example, the encryption steps of FIGS. 16A-16F may be performed in advance of when secure offline access to the $Secret_1$ 1602 is actually needed. In other embodiments, $Encrypted Block_1$ 1608 may be cached on a device physically or logically separate from endpoint computing device 1601. For example, $Encrypted Block_1$ 1608 may be stored on a separate storage device within short-range communication of endpoint computing device 1601 and/or auxiliary device 1603.

FIGS. 17A-17D depict example system arrangements 1700A-1700D for decrypting and provisioning a secret required to access a secure resource. According to system arrangements 1700A-1700D, endpoint computing device 1701 and auxiliary device 1703 may be similar to those discussed above in connection with FIGS. 16A-16F. Further, $Secret_1$ 1702 and the cryptographic keys discussed in connection with FIGS. 17A-17D are similar to those discussed above in connection with FIGS. 16A-16F.

Figure 16F:
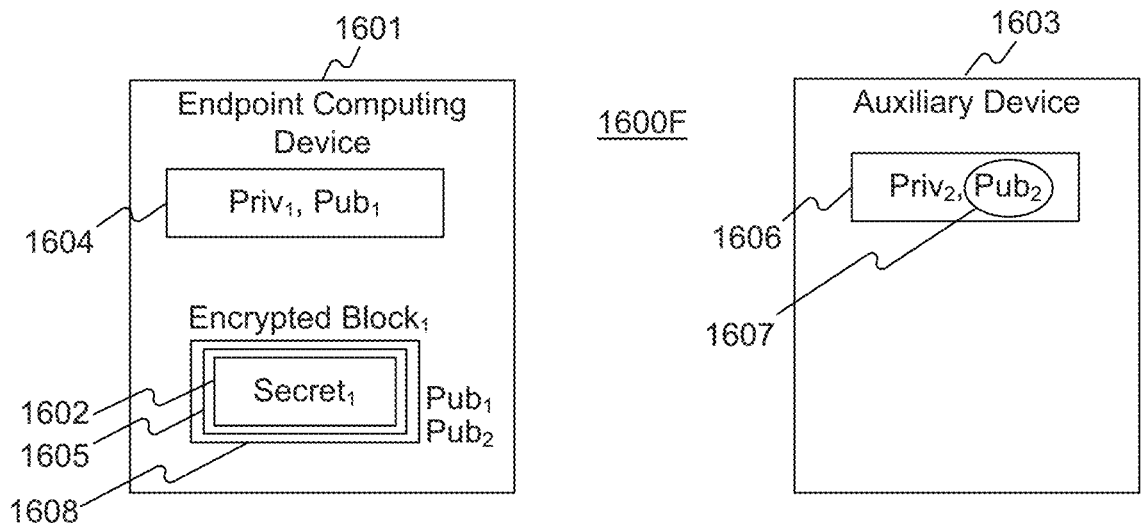
Figure 17A:
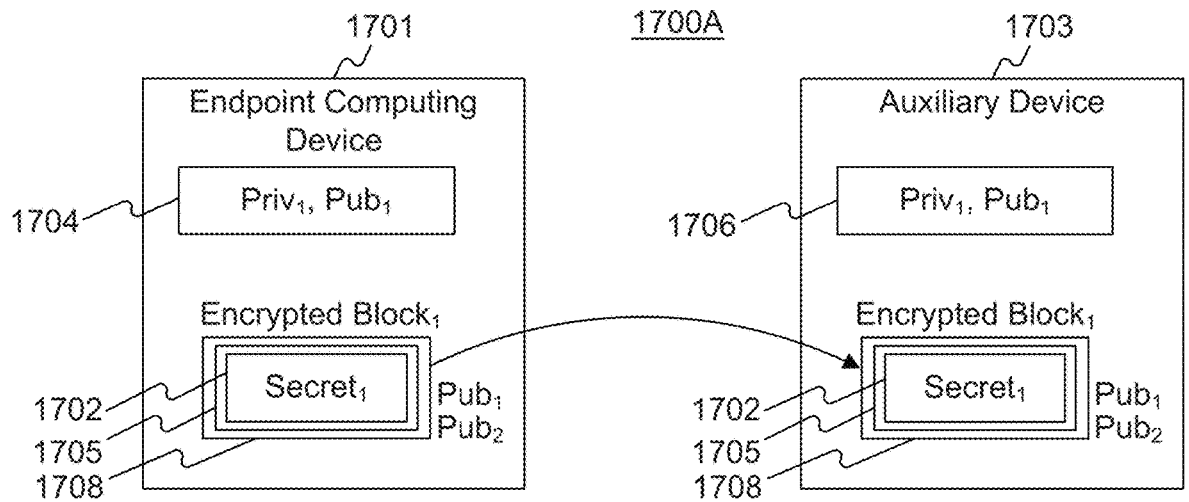
FIGS. 17A-D are illustrations of example system arrangements for decrypting and provisioning a secret required to access a secure resource, in accordance with disclosed embodiments.

In the environment of FIG. 17A, endpoint computing device 1701 has stored in a memory a $Secret_1$ 1702, which has been encrypted through the techniques of FIGS. 16B-C to produce an encrypted $Secret_1$ 1705, which in turn has been encrypted through the techniques of FIGS. 16D-F to produce an $Encrypted Block_1$ 1708. In the environment of FIG. 17A, a user of endpoint computing device 1701 may need to retrieve $Secret_1$ 1702 in order to perform an access-restricted function. For example, the user may want to log on to a computing machine associated with endpoint computing device 1701, log on to a secure application running on endpoint computing device 1701, access sensitive data or documents stored on endpoint computing device 1701, or perform other access-restricted functions.

According to such embodiments, the user may initiate (or endpoint computing device 1701 itself may initiate) a process of retrieving and decrypting $Encrypted Block_1$ 1708. As shown in FIG. 17A, the $Encrypted Block_1$ 1708 may be transmitted from endpoint computing device 1701 to auxiliary device 1703. For example, as discussed above in connection with FIGS. 2 and 3, $Encrypted Block_1$ 1708 may be transmitted using a variety of techniques, such as two-dimensional or three-dimensional bar code reading, image detection, infrared communications, RFID, Bluetooth or other NFC communications, audible (e.g., vocal) communications, or through other techniques. $Encrypted Block_1$ 1708 may then be stored in a memory (e.g., hard drive, RAM, etc.) of auxiliary device 1703.

Figure 17B:
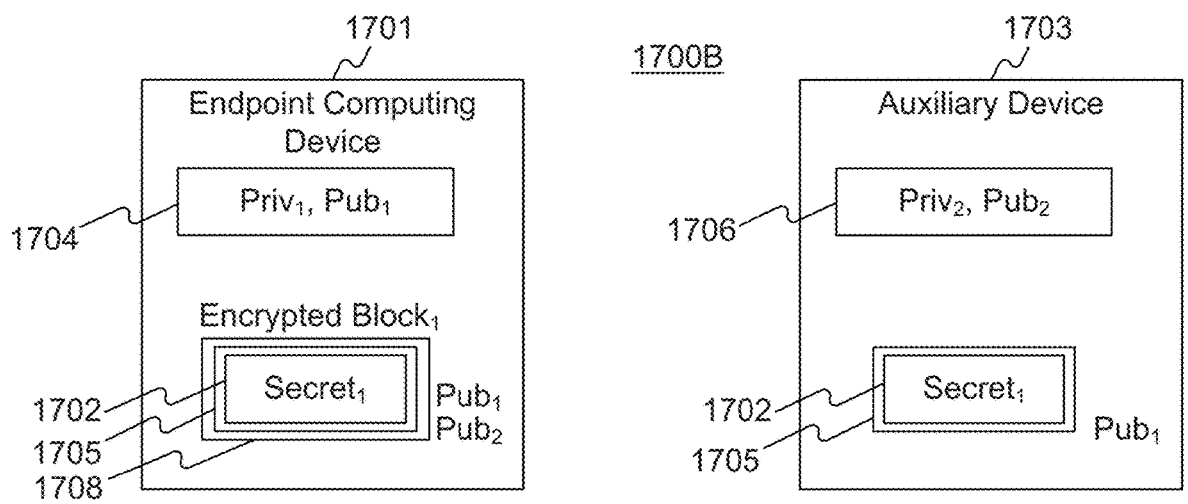

As shown in FIG. 17B, once auxiliary device 1703 has received $Encrypted Block_1$ 1708, it may decrypt $Encrypted Block_1$ 1708 using a cryptographic key available (e.g., previously stored or generated) on auxiliary device 1703. In the embodiment illustrated in FIG. 17B, a private key from public/private key pair 1706 may be used to decrypt $Encrypted Block_1$ 1708. The result of decrypting $Encrypted Block_1$ 1708 is the encrypted version of $Secret_1$ 1702, in other words, encrypted $Secret_1$ 1705.

Figure 17C:
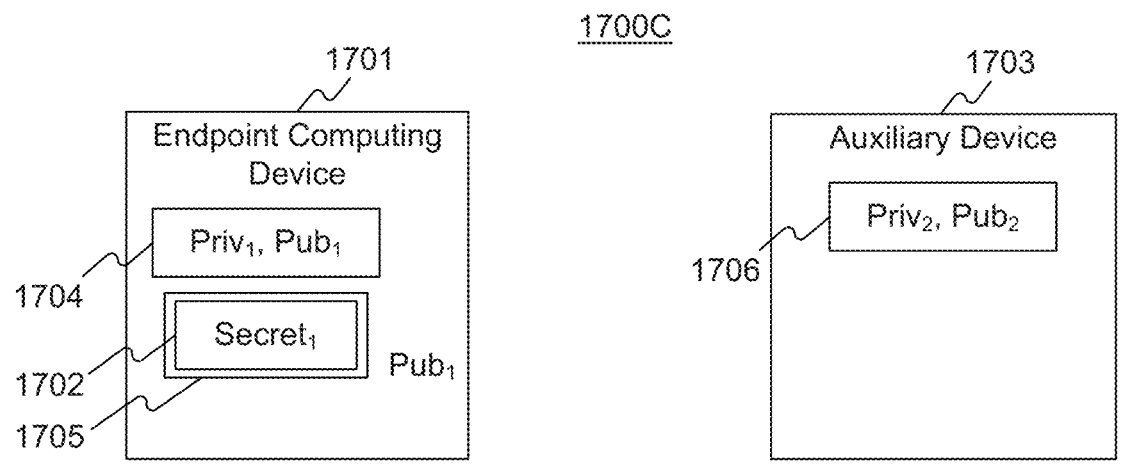

After the decryption, auxiliary device 1703 may send the decrypted $Encrypted Block_1$ 1708 (i.e., encrypted $Secret_1$ 1705) to endpoint computing device 1701, as shown in FIG. 17C. Consistent with the discussion above in FIGS. 2 and 3, encrypted $Secret_1$ 1705 may be transmitted from auxiliary device 1703 using a variety of techniques, such as two-dimensional or three-dimensional bar code reading, image detection, infrared communications, RFID, Bluetooth or other NFC communications, audible (e.g., vocal) communications, or through other techniques. Encrypted $Secret_1$ 1705 may then be stored in a memory (e.g., hard drive, RAM, etc.) of endpoint computing device 1701.

Figure 17D:
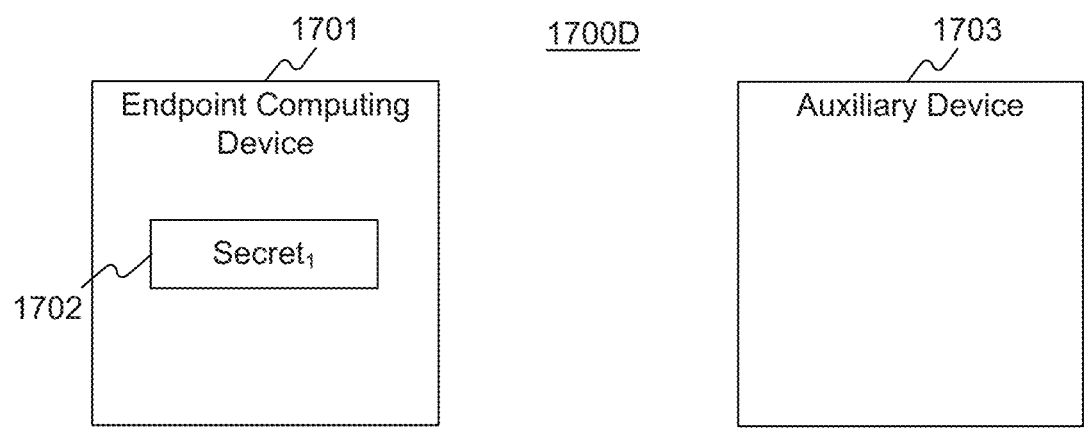

As shown in FIG. 17D, encrypted $Secret_1$ 1705 may then be decrypted by endpoint computing device 1701 using a cryptographic key available (e.g., accessed or generated) by endpoint computing device 1701. In the example embodiment illustrated in FIG. 17D, a private key from a public/private key pair 1704 on endpoint computing device 1701 may be used to decrypt encrypted $Secret_1$ 1705. The result of decrypting encrypted $Secret_1$ 1705 is to yield the original secret, $Secret_1$ 1702.

Using this technique, access to $Secret_1$ 1702 is securely conditioned on a user of endpoint computing device 1701 and auxiliary device 1703 being in proximity to both devices, such that the two devices can communicate in a short-range or near-field manner and without requiring access to a network (e.g., the Internet). Accordingly, even if an actor improperly obtained access to endpoint computing device 1701, they would not be able to access $Secret_1$ 1702 without also having access to auxiliary device 1703. On the other hand, a user who properly has access to both endpoint computing device 1701 and auxiliary device 1703 is able to access Secret₁ 1702 without needing to establish a network connection (e.g., Internet or LAN connection) with an external resource (e.g., security server 1103/1203 or secret vault 1104/1204, of FIGS. 11 and 12).

Figure 18A:
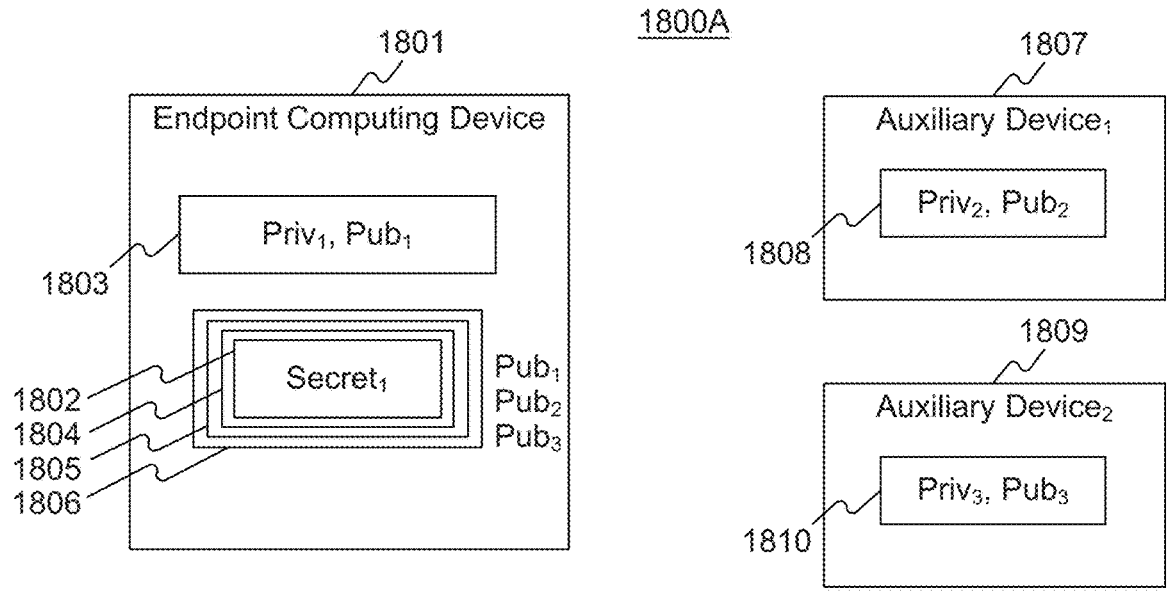
FIGS. 18A and 18B are example system arrangements for offline provisioning of a secret required to access a secure resource, in accordance with disclosed embodiments.
Figure 18B:
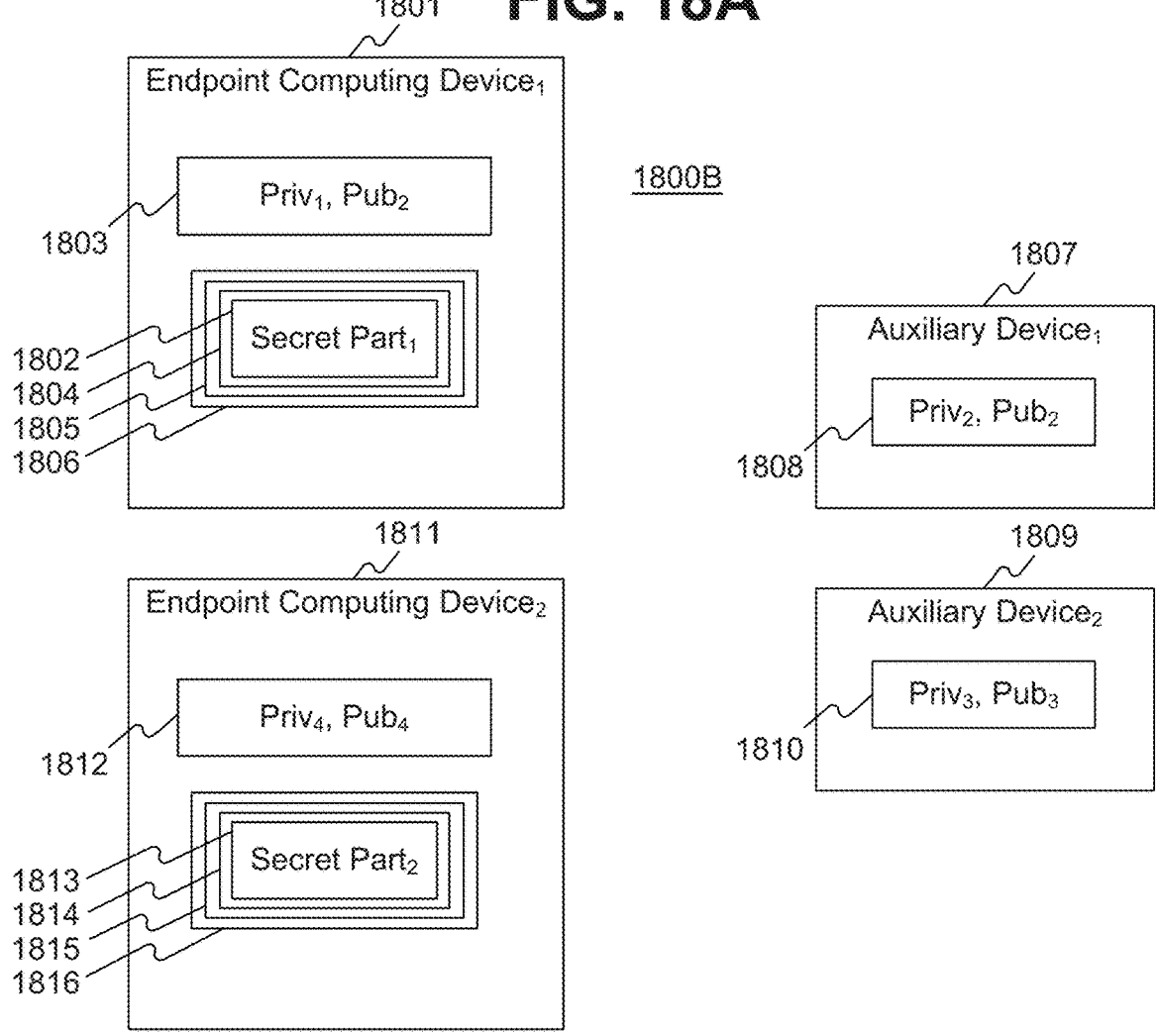

FIGS. 18A and 18B illustrate additional embodiments, consistent with the techniques of secure offline access to secrets, as discussed above. In system 1800A of FIG. 18A, there may be a single endpoint computing device 1801 but two (or more) auxiliary devices 1807 and 1809. Similar to above embodiments, endpoint computing device 1801 and auxiliary devices 1807/1809 may be similar to those discussed above in connection with FIGS. 15A-B, 16A-16F, and 17A-17D. Further, Secret₁ 1802 may be similar to Secret₁ 1602/1702, public/private cryptographic key pairs 1803, 1808, and 1810 may be similar to public/private cryptographic key pairs 1604/1704 and 1606/1706. Likewise, encrypted Secret₁ 1804 and Encrypted Block₁ 1805 may be similar to encrypted Secret₁ 1605/1705 and Encrypted Block₁ 1608/1708.

Unlike in the example embodiments above, in the embodiment of FIG. 18A each of Auxiliary Device₁ 1807 and Auxiliary Device₂ 1809 may have its own cryptographic keys 1808/1810, which may be symmetric keys or public/private key pairs. As illustrated in FIG. 18A, Auxiliary Device₁ 1807 and Auxiliary Device₂ 1809 each have public/private key pairs 1808 and 1810, respectively. Accordingly, consistent with the above encryption techniques of FIGS. 16A-16F, public keys from public/private key pairs 1808 and 1810 may each be used to encrypt encrypted Secret₁ 1804. For example, using a public key from Auxiliary Device₁ 1807, encrypted Secret₁ 1804 may be encrypted to produce Encrypted Block₁ 1805. Further, using a public key from Auxiliary Device₂ 1809, the Encrypted Block₁ 1805 itself may also be encrypted to produce a twice-encrypted or doubly-encrypted version of Encrypted Block₁ 1805, i.e., twice Encrypted Block₁ 1806. Once twice Encrypted Block₁ 1806 has been created and stored on endpoint computing device 1801, it may be decrypted by a private key of Auxiliary Device₂ 1809 to produce Encrypted Block₁ 1805. Further, Auxiliary Device₁ 1807 may decrypt Encrypted Block₁ 1805 using a private key maintained on Auxiliary Device₁ 1807 to produce encrypted Secret₁ 1804. The encrypted Secret₁ 1804 may then be sent to endpoint computing device 1801, where endpoint computing device 1801 may decrypt encrypted Secret₁ 1804 using a private key from key pair 1803 to produce Secret₁ 1802. Of course, in the above examples shown in FIG. 18A, symmetric keys may be used instead of asymmetric keys. Further consistent with above embodiments, each of endpoint computing device 1801, Auxiliary Device₁ 1807, and Auxiliary Device₂ 1809 may exchange the above-discussed encrypted versions of Secret₁ 1802 using near-field or short-range wireless communications, visual (e.g., scanning) techniques, audible (e.g., vocal) techniques, or other techniques not requiring a network connection.

In some embodiments, there may be multiple endpoint computing devices, each holding a part of a secret, such that the parts of the secret may be securely accessed in an offline technique. For example, as shown in FIG. 18B, there are two endpoint computing devices, Endpoint Computing Device₁ 1801 and Endpoint Computing Device₂ 1811. As in FIG. 18A, there are also two auxiliary devices, Auxiliary Device₁ 1807 and Auxiliary Device₂ 1809. Endpoint Computing Device₁ 1801 may have a public/private key pair 1803, and Endpoint Computing Device₂ 1811 may have its own public/private key pair 1812. Similarly, Auxiliary Device₁ 1807 may have a public/private key pair 1808, and Auxiliary Device₂ 1809 may have its own public/private key pair 1810.

Consistent with the discussion above, a portion of a secret, Secret Part₁ 1802, may be encrypted with a key (e.g., public key) stored on Endpoint Computing Device₁ 1801, to form an encrypted Secret Part₁ 1804. The encrypted Secret Part₁ 1804 may be encrypted by a key (e.g., public key) from Auxiliary Device₁ 1807 to form an Encrypted Secret Part₁ Block 1805, which may further be encrypted using a key (e.g., public key) from Auxiliary Device₂ 1809 to produce a twice-encrypted Secret Part₁ Block 1806. The twice-encrypted Secret Part₁ Block 1806 may then be decrypted, using the techniques above, to yield Secret Part₁ 1802. This decryption may involve, for example, private keys from Auxiliary Device₁ 1807, Auxiliary Device₂ 1809, and Endpoint Computing Device₁ 1801.

An additional part of the secret, Secret Part₂ 1813, is stored on Endpoint Computing Device₂ 1811. Just like the encryption process for Secret Part₁ 1802, an encryption process may be applied to Secret Part₂ 1813. In some embodiments, Secret Part₁ 1802 and Secret Part₂ 1813 may each be part of a single secret, such that a combination (e.g., concatenation or addition) of Secret Part₁ 1802 and Secret Part₂ 1813 may enable access to an access-protected resource (e.g., an operating system, application, file, data, etc.). Further, Secret Part₁ 1802 and Secret Part₂ 1813 may be split or partitioned, and recombined, according to the partitioning schemes discussed above in connection with FIG. 11.

In system 1800B of FIG. 18B, Secret Part₂ 1813 may be encrypted using a cryptographic key (e.g., public key) from public/private key pair 1812 on Endpoint Computing Device₂ 1811. The encrypted Secret Part₂ 1814 may then be encrypted by a key from Auxiliary Device₁ 1807 to form Encrypted Secret Part₂ Block 1815, and encrypted again using a key from Auxiliary Device₂ 1809 to form twice-encrypted Secret Part₂ Block 1816. Using the decryption techniques above (e.g., using a private key from Auxiliary Device₁ 1807, Auxiliary Device₂ 1809, and Endpoint Computing Device₂ 1811), the twice-encrypted Secret Part₂ Block 1816 may be decrypted to ultimately yield Secret Part₂ 1813. Once Secret Part₂ 1813 and Secret Part₁ 1802 have been produced, they may be combined (e.g., Endpoint Computing Device₂ 1811 may send Secret Part₂ 1813 to Endpoint Computing Device₁ 1801, or vice versa), and Endpoint Computing Device₁ 1801 may combine Secret Part₁ 1802 with Secret Part₂ 1813 to form the complete secret, which may be used to access an access-restricted resource (e.g., a resource on Endpoint Computing Device₁ 1801).

Figure 19:
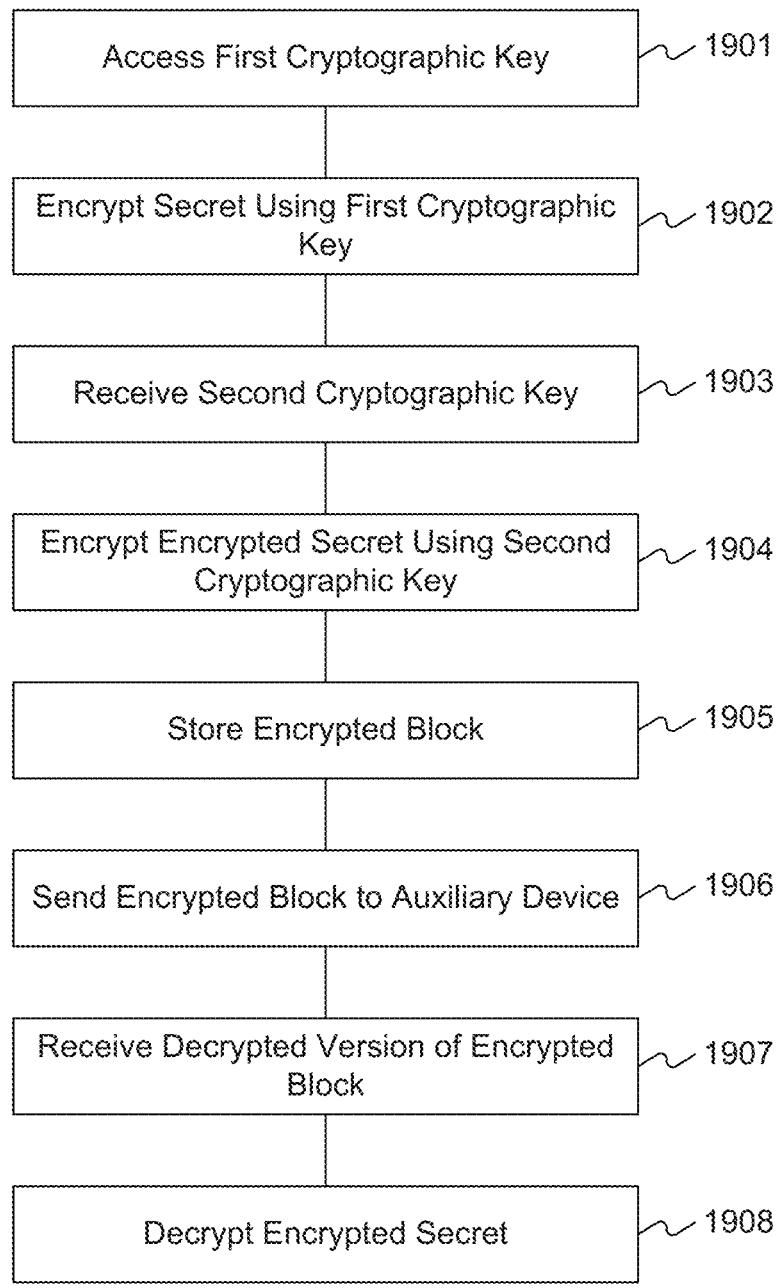
FIG. 19 is a flowchart illustrating an exemplary process for secure offline provisioning of a secret required to access a secure resource, in accordance with disclosed embodiments.

FIG. 19 is flowchart illustrating an exemplary process 1900 for secure offline provisioning of a secret required to access a secure resource. Consistent with the discussion above, process 1900 may be practiced in the environment of FIGS. 15A-B, where there is no network connection available (e.g., no Internet connection) for an endpoint computing device and auxiliary device. Of course, process 1900 may be practiced in situations where a network connection is available, but process 1900 need not use or rely on such a network connection. The encryption portions of process 1900 (e.g., steps 1901-1905) may correspond to the encryption techniques of FIGS. 16A-16F, and the decryption portions (e.g., steps 1906-1908) may correspond to FIGS. 17A-17D.

Process 1900 may include an operation 1901 of accessing, at an endpoint computing resource storing a secret, a first cryptographic key. For example, as described in connection with FIGS. 16A-16B, an endpoint computing device may access a locally stored key or generate a new key. The cryptographic key may be symmetric or asymmetric, and may have a permanent lifetime or a limited lifetime (e.g., single-use, single-session, time-to-live, etc.). The secret may be initially obtained and stored in clear-text format (e.g., without encryption) on the endpoint resource.

In operation 1902, process 1900 includes encrypting the secret using the first cryptographic key to produce an encrypted secret. For example, as described in connection with FIGS. 16B-16C, the secret stored on the endpoint may be encrypted using a key accessed or generated by the endpoint. The encryption may be based on a symmetric or asymmetric (e.g., public) key.

In an operation 1903, process 1900 includes receiving, from at least one auxiliary device configured for local and non-network based (e.g., non-Internet or non-LAN) communications with the endpoint computing resource, a second cryptographic key. For example, as described above in connection with FIGS. 16D-16E, a cryptographic key accessed or generated by an auxiliary device (e.g., mobile phone, tablet, smart clothing, etc.) may be transmitted via short-range or near-field communications to the endpoint computing device. Such transmission may not require a network connection, such as an Internet connection. In some embodiments, as discussed above in connection with FIG. 18A, there may be multiple auxiliary devices involved in process 1900. Further, as described in connection with FIG. 18B, there may be multiple endpoint resources. The second cryptographic key may be symmetric or asymmetric (e.g., public key).

In operation 1904, process 1900 includes encrypting the encrypted secret with the second cryptographic key to produce an encrypted block. For example, as discussed in connection with FIGS. 16E-16F, a cryptographic key received from the auxiliary device may be used to encrypt the already-encrypted secret, to form an encrypted block. The encryption of the encrypted secret may be based on a symmetric or asymmetric key from the auxiliary device. Once the encrypted block has been formed, it may be cached on the endpoint resource in operation 1905. For example, the encrypted block may be stored in a hard drive, RAM, or other memory of the endpoint resource.

In operation 1906, process 1900 includes sending, without using a network connection, the encrypted block to the at least one auxiliary device for decryption. In some embodiments, operation 1906 may occur when a user of the endpoint resource and auxiliary device lacks any network connection or lacks a sufficiently strong connection. For example, the user may be on an airplane, train, or in a remote area. Alternatively, operation 1906 may occur when the user has a network connection (e.g., Internet or LAN connection), but operation 1906 is practiced without using such a network connection. Accordingly, the endpoint resource may send the encrypted block to the auxiliary device using a short-range or near-field technique (e.g., RFID, Bluetooth, infrared, bar-code scanning, image recognition, vocal recognition, etc.).

In an operation 1907, process 1900 includes receiving, from the at least one auxiliary device and without using a network connection, a decrypted version of the encrypted block. For example, as discussed above, the auxiliary device may receive the encrypted block from the endpoint, and decrypt the encrypted block to produce the encrypted secret. Once the auxiliary device has produced the encrypted secret, it may send the encrypted secret back to the endpoint (e.g., via the short-range or near-field techniques discussed above). The endpoint is then able, in operation 1908, to decrypt the encrypted secret with a cryptographic key corresponding to the first cryptographic key. In situations where a symmetric key was used to originally encrypt the secret, the same symmetric key may be used in this decryption operation. Alternatively, where a public asymmetric key was used to encrypt the secret, a corresponding private key (from the public/private key pair of the endpoint) may be used to perform the decryption. Decrypting the encrypted secret in this manner yields the original secret itself.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for securely caching and provisioning secrets for use in an offline process, the operations comprising:
   accessing, at an endpoint computing resource storing a secret, a first cryptographic key, wherein the first cryptographic key is generated dynamically based on receiving the secret;
   encrypting the secret using the first cryptographic key to produce an encrypted secret;
   receiving, from at least one auxiliary device, a second cryptographic key, the second cryptographic key being dynamically generated by the auxiliary device or accessed from a storage of the auxiliary device;

encrypting, at the endpoint computing resource, the encrypted secret with the second cryptographic key to produce an encrypted block;

storing the encrypted block;

sending, using a short-range wireless communication and without using a network connection, the encrypted block to the at least one auxiliary device for decryption;

receiving, from the at least one auxiliary device and without using a network connection, a decrypted version of the encrypted block, the decrypted version including the encrypted secret; and decrypting the encrypted secret with a cryptographic key corresponding to the first cryptographic key, the decrypted secret allowing the endpoint computing device to perform an action.

2. The non-transitory computer readable medium of claim 1, wherein the secret is configured to provide secure and access-restricted access to an application, operating system, file, or service provided by the endpoint computing device.

3. The non-transitory computer readable medium of claim 1, wherein the first cryptographic key is a symmetric key.

4. The non-transitory computer readable medium of claim 1, wherein the first cryptographic key is an asymmetric key from a private-public key pair, and wherein encrypting the secret includes encrypting the secret using a public key from the private-public key pair.

5. The non-transitory computer readable medium of claim 3, wherein the cryptographic key corresponding to the first cryptographic key is a private key from the private-public key pair.

6. The non-transitory computer readable medium of claim 1, wherein accessing the first cryptographic key includes generating the first cryptographic key.

7. The non-transitory computer readable medium of claim 1, wherein the second cryptographic key is a symmetric key.

8. The non-transitory computer readable medium of claim 1, wherein the second cryptographic key is an asymmetric key from a private-public key pair.

9. The non-transitory computer readable medium of claim 1, wherein the encrypted block is stored on the endpoint computing resource.

10. The non-transitory computer readable medium of claim 1, wherein the encrypted block is stored on a device physically separate from the endpoint computing resource, which is configured for local and non-network based communications with the at least one auxiliary device.

11. A computer-implemented method for securely caching and provisioning secrets for use in an offline process, the method comprising:

accessing, at an endpoint computing resource storing a secret, a first cryptographic key, wherein the first cryptographic key is generated dynamically based on receiving the secret;

encrypting the secret using the first cryptographic key to produce an encrypted secret;

receiving, from at least one auxiliary device configured for local and non-network based communications with the endpoint computing resource, a second cryptographic key;

encrypting, at the endpoint computing resource, the encrypted secret with the second cryptographic key to produce an encrypted block;

storing the encrypted block;

sending, using a short-range wireless communication and without using a network connection, the encrypted block to the at least one auxiliary device for decryption;

receiving, from the at least one auxiliary device and without using a network connection, a decrypted version of the encrypted block, the decrypted version including the encrypted secret; and decrypting the encrypted secret with a cryptographic key corresponding to the first cryptographic key, the decrypted secret allowing the endpoint computing device to perform an action.

12. The computer-implemented method of claim 11, wherein the second cryptographic key is received from the at least one auxiliary device via at least one of: RFID, Bluetooth, an image or textual code, or an auditory signal.

13. The computer-implemented method of claim 11, wherein the encrypted block is sent to the at least one auxiliary device via at least one of: RFID, Bluetooth, an image or textual code, or an auditory signal.

14. The computer-implemented method of claim 11, wherein the at least one auxiliary device is at least one of: a mobile telephonic device, a mobile tablet device, an element of computer-enabled clothing, or an element of computer-enabled jewelry.

15. The computer-implemented method of claim 11, wherein the first cryptographic key is a one-time-use key.

16. The computer-implemented method of claim 11, wherein the first cryptographic key becomes invalid after decrypting the encrypted secret with the cryptographic key corresponding to the first cryptographic key.

17. The computer-implemented method of claim 11, wherein the first cryptographic key becomes invalid after a session between the at least one auxiliary device and the endpoint computing resource.

18. The computer-implemented method of claim 11, wherein the first cryptographic key expires after a determined duration.

19. The computer-implemented method of claim 11, further comprising:

receiving, from a second auxiliary device configured for local and non-network based communications with the endpoint computing resource, a third cryptographic key; and encrypting the encrypted block with the third cryptographic key to produce a doubly encrypted block.

20. The computer-implemented method of claim 19, further comprising receiving, from the second auxiliary device and without using a network connection, a decrypted version of the doubly encrypted block, the decrypted version including the encrypted block.

* * * * *